(12) United States Patent
Kimura et al.

(10) Patent No.: US 10,967,869 B2
(45) Date of Patent: Apr. 6, 2021

(54) ROAD SURFACE CONDITION ESTIMATION APPARATUS AND ROAD SURFACE CONDITION ESTIMATION METHOD

(71) Applicant: TOYOTA JIDOSHA KABUSHIKI KAISHA, Toyota (JP)

(72) Inventors: Yosuke Kimura, Nissin (JP); Hiroshi Majima, Shinagawa-ku (JP); Masaya Fujimori, Susono (JP); Takeo Moriai, Nagakute (JP); Tatsuya Obuchi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 16/382,263

(22) Filed: Apr. 12, 2019

(65) Prior Publication Data
US 2019/0329786 A1    Oct. 31, 2019

(30) Foreign Application Priority Data

Apr. 25, 2018 (JP) .............................. JP2018-084209
Jul. 10, 2018 (JP) .............................. JP2018-130872
Jan. 15, 2019 (JP) .............................. JP2019-004123

(51) Int. Cl.
*B60W 40/072* (2012.01)
*B60W 40/107* (2012.01)
*G07C 5/00* (2006.01)

(52) U.S. Cl.
CPC ........ *B60W 40/072* (2013.01); *B60W 40/107* (2013.01); *G07C 5/008* (2013.01);
(Continued)

(58) Field of Classification Search
CPC . B60W 2050/0051; B60W 2050/0055; B60W 2050/146; B60W 2520/105;
(Continued)

(56) References Cited

U.S. PATENT DOCUMENTS 5,294,210 A * 3/1994 Lemelson ............. B05B 12/122
                                                       404/108
5,719,565 A * 2/1998 Tsuno ................ B60G 17/0165
                                                       340/442
(Continued)

FOREIGN PATENT DOCUMENTS

EP    3 059 129 A1    8/2016
EP    3 226 222 A1    10/2017
(Continued)

OTHER PUBLICATIONS

"US-Japan Collaborative Research on Probe Data: Assessment Report", Ministry of Land, Infrastructure, Transport and Tourism, Japan, National Institute for Land and Infrastructure Management, (URL:http://www.nilim.go.jp/lab/bcg/siryou/tnn/tnn0820pdf/ks0820.pdf) Jan. 2015, 259 pages (with English Translation).

*Primary Examiner* — Babar Sarwar
(74) *Attorney, Agent, or Firm* — Oblon, McClelland, Maier & Neustadt, L.L.P.

(57) ABSTRACT

A road surface condition estimation apparatus (1) is provided with a collecting device (111) for collecting, from vehicle (2), behavior information relating to a behavior of the vehicle; a determining device (112) for determining on the basis of the behavior information whether or not an abnormality condition is satisfied, the abnormality condition being set on the basis of a specific behavior that is expected to be taken by the vehicle when the vehicle encounters a road surface abnormality; and an estimating device (112) for estimating a condition of the road surface on the basis of a determined result of the determining device.

17 Claims, 11 Drawing Sheets

(52) U.S. Cl.
CPC ..... *B60W 2552/00* (2020.02); *B60W 2554/00* (2020.02); *B60W 2556/45* (2020.02)

(58) Field of Classification Search
CPC ....... B60W 2520/125; B60W 2520/28; B60W 2552/00; B60W 2554/00; B60W 2556/45; B60W 2556/50; B60W 2556/55; B60W 2556/65; B60W 2756/10; B60W 40/06; B60W 40/072; B60W 40/107; G07C 5/008

See application file for complete search history.

(56) References Cited

U.S. PATENT DOCUMENTS

| | | | | |
|---|---|---|---|---|
| 5,803,661 | A * | 9/1998 | Lemelson | E01C 23/07 299/41.1 |
| 5,938,707 | A * | 8/1999 | Uehara | G05D 1/0261 180/167 |
| 6,484,089 | B1 * | 11/2002 | Millington | G01C 21/26 340/348 |
| 9,626,763 | B1 * | 4/2017 | Hoye | G06K 9/4604 |
| 9,815,475 | B2 * | 11/2017 | Spata | E01C 23/01 |
| 9,827,991 | B2 * | 11/2017 | Pettersson | B60T 8/172 |
| 10,144,380 | B2 * | 12/2018 | Laskey | B60K 17/165 |
| 10,160,447 | B2 * | 12/2018 | Lavoie | B60W 50/00 |
| 10,363,790 | B2 * | 7/2019 | Hoffmann | B60G 17/0165 |
| 2004/0107042 | A1 * | 6/2004 | Seick | G08G 1/0104 701/117 |
| 2004/0122580 | A1 * | 6/2004 | Sorrells | G07C 5/008 701/80 |
| 2009/0192688 | A1 * | 7/2009 | Padmanabhan | G08G 1/0104 701/70 |
| 2009/0271469 | A1 * | 10/2009 | Benco | H04N 21/2743 709/201 |
| 2010/0152942 | A1 * | 6/2010 | Stratton | B60T 8/175 701/25 |
| 2011/0022267 | A1 * | 1/2011 | Murphy | B60W 30/04 701/38 |
| 2012/0078572 | A1 * | 3/2012 | Bando | G08G 1/0112 702/150 |
| 2013/0155061 | A1 * | 6/2013 | Jahanshahi | G06T 15/00 345/419 |
| 2014/0122014 | A1 * | 5/2014 | Flik | G06K 9/00791 702/141 |
| 2014/0160295 | A1 * | 6/2014 | Kyomitsu | G08G 1/0112 348/159 |
| 2014/0196529 | A1 * | 7/2014 | Cronin | E01C 23/01 73/146 |
| 2014/0309930 | A1 * | 10/2014 | Ricci | G06F 3/0673 701/431 |
| 2014/0355839 | A1 * | 12/2014 | Bridgers | B60W 40/06 382/108 |
| 2015/0166061 | A1 * | 6/2015 | Wang | B60W 30/02 701/44 |
| 2015/0347478 | A1 * | 12/2015 | Tripathi | G06F 16/2246 707/743 |
| 2016/0093210 | A1 * | 3/2016 | Bonhomme | G08G 1/0967 340/905 |
| 2016/0221581 | A1 * | 8/2016 | Talwar | B60W 30/00 |
| 2016/0236689 | A1 * | 8/2016 | Pettersson | B60T 8/172 |
| 2018/0165966 | A1 * | 6/2018 | Ishikawa | B60W 50/14 |

FOREIGN PATENT DOCUMENTS

| | | |
|---|---|---|
| JP | 09-020223 | 1/1997 |
| JP | 2005-249525 | 9/2005 |
| JP | 2017-226322 | 12/2017 |
| WO | WO 2018/025341 A1 | 2/2018 |

* cited by examiner

ROAD SURFACE CONDITION ESTIMATION APPARATUS AND ROAD SURFACE CONDITION ESTIMATION METHOD

TECHNICAL FIELD

The present invention relates to a technical field of a road surface condition estimation apparatus and a road surface condition estimation method each of which is configured to estimate a condition of a road surface, for example.

BACKGROUND ART

A Patent Literature 1 discloses a method of estimating a condition of a road surface by frequency-analyzing a wheel speed signal to thereby calculate a vibration gain, calculating a resonance gain correction coefficient corresponding to a difference between a reference pressure and an inner pressure of a tire, calculating a corrected vibration gain on the basis of the vibration gain and the resonance gain correction coefficient, and comparing the corrected vibration gain with a threshold value, for example. A Patent Literature 2 discloses a method of executing a filtering process for extracting a high frequency component from a wheel acceleration rate and determining on the basis of a dispersion value of the filtering-processed wheel acceleration rate whether a road condition is bad or not. A Patent Literature 3 discloses a method of collecting, as a road surface condition data, a calculated result of a level of a high frequency component of a detection signal from a vibration detecting device when a tread surface of a tire at which the vibration detecting device is placed hugs (in other words, contacts) a road and then estimating a condition of a road surface on the basis of the road surface condition data.

A Non Patent Literature 1 discloses an application (a road and infrastructure deterioration diagnosis application) that detects, on the basis of a probe data collected from a vehicle, a deterioration of a road surface including presence of a potential pothole and rough road surface location, and provides recommendation of road location needing maintenance to a maintenance manager and vehicle operator. This application matches the probe data including a speed and a location of a vehicle against a digital road map to estimate a location at which a road surface deteriorates (a location of deteriorated pavement and uneven surface, for example).

CITATION LIST

Patent Literature

[Patent Literature 1] Japanese Unexamined Patent Application Publication No. 2005-249525
[Patent Literature 2] Japanese Unexamined Patent Application Publication No. H09-020223
[Patent Literature 3] Japanese Unexamined Patent Application Publication No. H2017-226322

Non Patent Literature

[Non Patent Literature 1] Ministry of Land, Infrastructure, Transport and Tourism, Japan, National Institute for Land and Infrastructure Management, "US-Japan Collaborative Research on Probe Data: Assessment Report", page 94 [online], January 2015, [searched on Mar. 27, 2018], internet (URL: http://www.nilim.go.jp/lab/bcg/siryou/tnn/tnn0820pdf/ks0820.pdf)

SUMMARY OF INVENTION

Technical Problem

The Non Patent Literature 1 does not disclose concretely how the application estimates the location at which the road surface deteriorates by using the probe data. Therefore, the application disclosed in the Non Patent Literature 1 has room for improvement.

Moreover, each of the Patent Literature 1 to the Patent Literature 3 discloses the method of estimating the condition of the road surface on the basis of the information collected from single vehicle. Therefore, there is a technical problem that the method disclosed in each of the Patent Literature 1 to the Patent Literature 3 does not necessarily provide the estimated result with a sufficient degree of accuracy.

The above described technical problem is one example of the technical problem to be solved by the present invention. It is therefore an object of the present invention to provide, for example, a road surface condition estimation apparatus and a road surface condition estimation method each of which is configured to estimate a condition of a road surface appropriately.

Solution to Problem

A first aspect of a road surface condition estimation apparatus of the present invention is a road surface condition estimation apparatus having: a collecting device that is configured to collect, from each of a plurality of vehicles, behavior information relating to a behavior of each vehicle; a determining device that is configured to determine on the basis of the behavior information whether or not an abnormality condition is satisfied, the abnormality condition being set on the basis of a specific behavior, the specific behavior being a behavior expected to be taken by the vehicle when the vehicle encounters a road surface abnormality, the road surface abnormality including at least one of a defect of a road surface and an obstacle on the road surface; and an estimating device that is configured to estimate a condition of the road surface on the basis of a determined result of the determining device.

A second aspect of a road surface condition estimation apparatus of the present invention is a road surface condition estimation apparatus having: a collecting device that is configured to collect, from a vehicle, behavior information relating to a behavior of the vehicle; a determining device that is configured to determine on the basis of the behavior information whether or not the behavior of the vehicle is a specific behavior that the vehicle avoids a road surface abnormality, the road surface abnormality including at least one of a defect of a road surface and an obstacle on the road surface; and an estimating device that is configured to estimate a position of the road surface abnormality on the basis of a determined result of the determining device.

A first aspect of a road surface condition estimation method of the present invention is a road surface condition estimation method including: a collecting step at which an input information relating to an input from a road surface to a vehicle is collected from the vehicle with a position of the vehicle being associated with the input information; an extracting step at which an up-and-down component caused by concavity and/or convexity at the road surface is extracted from the input information; calculating step at which an index value representing a degree of the concavity and/or the convexity at the road surface is calculated on the basis of the up-and-down component and an average value of the index value at one point on a road is calculated; and determining step at which it is determined that the road surface is rough at the one point when the calculated average value is equal to or larger than a first predetermined value and it is determined that there exists local concavity and/or convexity at the one point when a maximum value at the one point is equal to or larger than a second predetermined value that is larger than the first predetermined value.

DESCRIPTION OF EMBODIMENTS

Hereinafter, with reference to drawings, one embodiment of each of the road surface condition estimation apparatus and the surface condition estimation method of the present invention will be described. In the following description, a road surface condition estimation system SYS to which one embodiment of each of the surface condition estimation apparatus and the surface condition estimation method of the present invention is adapted will be described.

(1) ROAD SURFACE CONDITION ESTIMATION SYSTEM SYS IN FIRST EMBODIMENT

Firstly, the road surface condition estimation system SYS in a first embodiment will be described. Note that the road surface condition estimation system SYS in the first embodiment is referred to as a "road surface condition estimation system SYS1" in the following description.

(1-1) Structure of Road Surface Condition Estimation System SYS1

Figure 1:
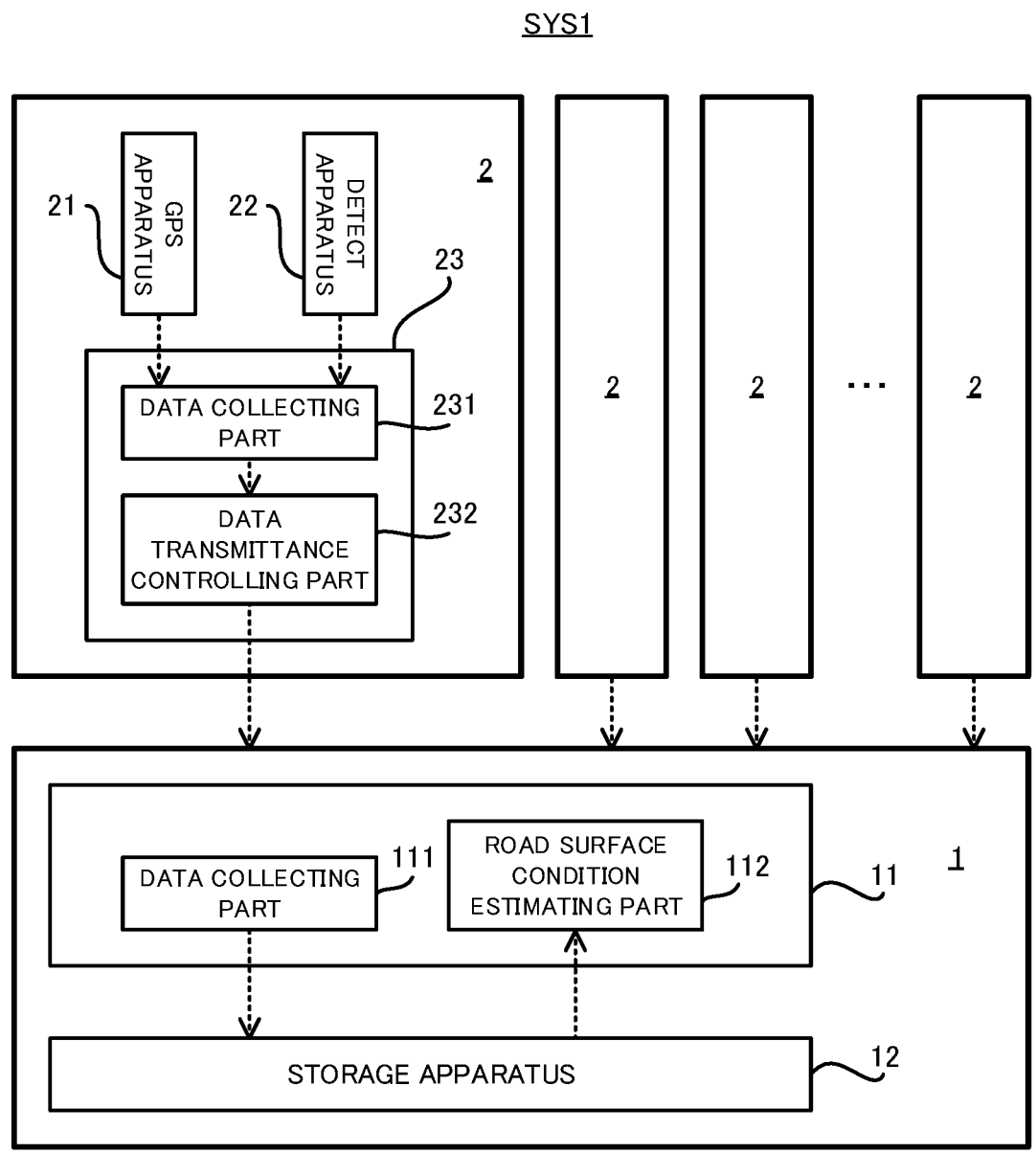
FIG. 1 is a block diagram that illustrates one example of a structure of a road surface condition estimation system in a first embodiment.

Firstly, with reference to FIG. 1, the structure of the road surface condition estimation system SYS1 in the first embodiment will be explained. FIG. 1 is a block diagram that illustrates the structure of the road surface condition estimation system SYS1 in the first embodiment.

The road surface condition estimation system SYS1 is configured to execute a road surface condition estimation operation for estimating a condition (in other words, a state) of a road surface on which a vehicle 2 travels. Especially, the road surface condition estimation system SYS1 is configured to execute, as the road surface condition estimation operation, an operation for estimating a position at which there exists a road surface abnormality including at least one of a defect of the road surface and an obstacle on the road surface (namely, a location of the road surface abnormality). The defect of the road means a matter that may adversely affect a traveling of the vehicle 2. At least one of a depression (in other words, a concave part) of the road surface, a hole at the road surface, a bump (in other words, a convex part) of the road surface, a rut (in other words, a groove) formed at the road surface, a crack at the road surface and a deterioration of the road surface is one example of the defect of the road surface. The obstacle on the road surface corresponds to an object on the road surface that may adversely affect the traveling of the vehicle 2. At least one of a falling object from the vehicle 2, a mass of peeled asphalt or the like, a falling rock, a vehicle involved in an accident and a dead animal is one example of the obstacle.

In order to execute the road surface condition estimation operation, as illustrated in FIG. 1, the road surface condition estimation system SYS1 is provided with: a server 1 that is one specific example of a "road surface condition estimation apparatus" in a below described additional statement; and at least one vehicle 2. Note that an example in which the road surface condition estimation system SYS1 is provided with the server 1 and a plurality of vehicles 2 will be described in the following description.

The server 1 is provided with: an information processing apparatus (in other words, a controller) 11 such as CPU (Central Processing Unit); and a storage apparatus 12 such as a recording medium (for example, at least one of a semiconductor memory and a hard disk). The information processing apparatus is one specific example of a "controller" in the below described additional statement The information processing apparatus 11 is a main apparatus that is configured to execute the road surface condition estimation operation. The information processing apparatus 11 is an apparatus that is programmed to execute the road surface condition estimation operation. The information processing apparatus 11 is configured to execute the road surface condition estimation operation by executing a computer program that makes the information processing apparatus 11 execute the road surface condition operation. In order to execute the road surface condition estimation operation, the information processing apparatus 11 includes, as processing blocks that are logically realized in the information processing apparatus 11 or processing circuits that are physically realized in the information processing apparatus 11, a data collecting part 111 that is one specific example of a "collecting device" in the below described additional statement and a road surface condition estimating part 112 that is one specific example of each of a "determining device" and a "estimating device" in the below described additional statement. Although an operation of each of the data collecting part 111 and the road surface condition estimating part 112 will be described later in detail with reference to FIG. 2 and so on, overview of the operation will be briefly described here. The data collecting part 111 is configured to collect a behavior data relating to a behavior of each of the plurality of vehicles 2 from each of the plurality of vehicles 2. The road surface condition estimating part 112 is configured to estimate the condition of the road surface on the basis of the behavior data collected by the data collecting part 111.

The storage apparatus 12 is configured to store information that is necessary for the operation of the information processing apparatus 11. For example, the storage apparatus 12 may be configured to store the behavior information collected by the data collecting part 111. For example, the storage apparatus 12 may be configured to store a road surface condition data relating to the condition of the road surface estimated by the road surface condition estimating part 112.

Each vehicle 2 is provided with: a GPS (Global Positioning System) apparatus 21; a detect apparatus 22; and an ECU (Electric Control Unit) 23.

The GPS apparatus 21 is configured to specify a current position of the vehicle 2 by receiving a radio wave from a GPS satellite.

The detect apparatus 22 is configured to detect the behavior of the vehicle 2. For example, the detect apparatus 22 may be configured to detect information that directly represents the behavior itself of the vehicle 2. At least one of a vehicle speed, a wheel speed, a longitudinal acceleration rate (in other words, an acceleration ratio in a front to rear direction), a lateral acceleration rate, a yaw rate, a yaw angle, a roll angle, a pitch angle and a slip ratio is one example of the information that directly represents the behavior itself of the vehicle 2. In this case, the detect apparatus 22 may include a sensor that is configured to detect the information that directly represents the behavior itself of the vehicle 2. Moreover, for example, the detect apparatus 22 may be configured to detect information that directly affects the behavior itself of the vehicle 2. In this case, the detect apparatus 22 may include a sensor that is configured to detect the information that directly affects the behavior itself of the vehicle 2. An information relating to an operational state of an operational apparatus that is operable by a driver to drive the vehicle 2 is one example of the information that directly affects the behavior itself of the vehicle 2. At least one of a handle (in other words, a steering wheel), an acceleration pedal, a brake pedal, a shift lever (alternatively, a selector) and a turn indicator is one example of the operational apparatus. At least one of a steering angle, a steering speed, a pedaled amount of the acceleration pedal, an acceleration position, a pedaled amount of the brake pedal and a gear range selected by the shift lever is one example of the information that directly affects the behavior itself of the vehicle 2. An information relating to an operational state of an assist system of the vehicle 2 to assist the traveling of the vehicle 2 is another one example of the information that directly affects the behavior itself of the vehicle 2. At least one of a LDA (Lane Departure Alert) system, an ABS (Anti-lock Brake System), a TRC (Traction Control) system and ESC (Electronic Stability Control) system is one example of the assist apparatus. Moreover, for example, the detect apparatus 22 may be configured to detect information relating to a circumstance of the vehicle 2 that may indirectly affect the behavior itself of the vehicle 2. In this case, the detect apparatus may include a sensor that is configured to detect the circumstance of the vehicle 2. At least one of a camera, any radar, any LIDAR (Light Detection and Ranging) is one example of the sensor that is configured to detect the circumstance of the vehicle 2.

The ECU 23 includes, as processing blocks that are logically realized in the ECU 23 or processing circuits that are physically realized in the ECU 23, a data collecting part 231 and a data transmittance controlling part 232. Although an operation of each of the data collecting part 231 and the data transmittance controlling part 232 will be described later in detail with reference to FIG. 2 and so on, overview of the operation will be briefly described here. The data collecting part 231 is configured to collect, from the GPS apparatus 21, a vehicle position data relating to the current position of the vehicle 2 detected by the GPS apparatus 21. Moreover, the data collecting part 231 is configured to collect, from the detect apparatus 22, the behavior data relating to the behavior of the vehicles 2 detected by the detect apparatus 22. The data transmittance controlling part 232 is configured to transmit the vehicle position data and the behavior data collected by the data collecting part 231 via a wireless communication network (alternatively, via a wired communication network in some cases).

(1-2) Road Surface Condition Estimation Operation Executed by Road Surface Condition Estimation System SYS1

Next, the road surface condition estimation operation executed by the road surface condition estimation system SYS1 will be described. In the first embodiment, the road surface condition estimation system SYS1 is configured to execute at least one of a first road surface condition estimation operation and a second road surface condition estimation operation. The first road surface condition estimation operation is an operation for estimating the condition of the road surface by focusing on a first specific behavior that the vehicle 2 travels to avoid the road surface abnormality (namely, the first specific behavior to avoid the road surface abnormality). The second road surface condition estimation operation is an operation for estimating the condition of the road surface by focusing on a second specific behavior that the vehicle 2 travels on a position of the road surface abnormality with the vehicle 2 being affected by the road surface abnormality (namely, the second specific behavior observed when the road surface abnormality affects the vehicle 2 while the vehicle 2 traveling). In the following description, the first and second road surface condition estimation operations will be described in order.

(1-2-1) Flow of First Road Surface Condition Estimation Operation

Figure 2:
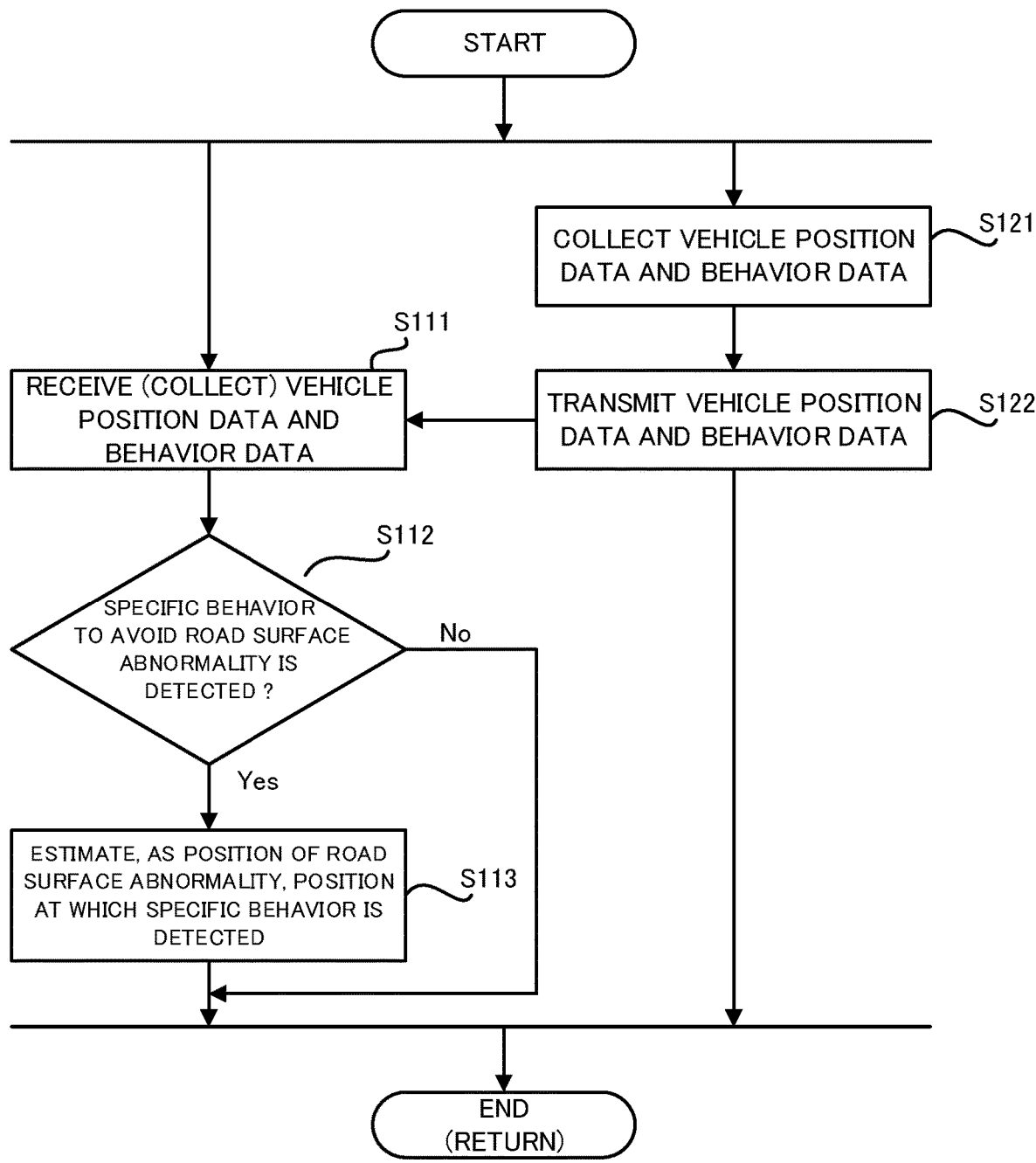
FIG. 2 is a flowchart that illustrates one example of a flow of a first road surface condition estimation operation executed by the road surface condition estimation system in the first embodiment.

Firstly, with reference to FIG. 2, a flow of the first road surface condition estimation operation will be described. FIG. 2 is a flowchart that illustrates one example of the flow of the first road surface condition estimation operation executed by the road surface condition estimation system SYS1 in the first embodiment.

As illustrated in FIG. 2, in order to execute the road surface condition estimation operation, the server 1 executes a process from a step S111 to a step S113 and each of the plurality of vehicles 2 executes a process from a step S121 to a step S122. Note that the server 1 may execute the process from the step S111 to the step S113 at a specific timing although the server 1 usually executes the process from the step S111 to the step S113 repeatedly. Similarly, each vehicle 2 may execute the process from the step S121 to the step S122 at a specific timing although each vehicle 2 usually executes the process from the step S121 to the step S122 repeatedly.

Specifically, the GPS apparatus 21 of each vehicle 2 specifies the current position of each vehicle 2. As a result, the data collecting part 231 of each vehicle 2 collects the vehicle position data relating to the current position of each vehicle 2 (the step S121). Moreover, the detect apparatus 22 of each vehicle 2 detects the behavior of each vehicle 2. As a result, the data collecting part 231 of each vehicle 2 collects the behavior data relating to the behavior of each vehicle 2 (the step S121). Note that the vehicle position data and the behavior data are outputted from the GPS apparatus 21 and the detect apparatus 22, respectively, to the ECU 23 as at least one portion of what we call a CAN (Controller Area Network) data.

Then, the data transmittance controlling part 232 transmits, to the server 1, the vehicle position data and the behavior data (namely, at least one portion of the CAN data) collected at the step S121 (the step S122).

The server 1 (especially, the data collecting part 111) receives (namely, collects) the vehicle position data and the behavior data transmitted by the vehicle 2 at the step S122 (the step S111) The vehicle position data and the behavior data collected by the data collecting part 111 may be stored by the storage apparatus 12. Note that the server 1 collects the vehicle position data and the behavior data from the plurality of vehicles 2, because the road surface condition estimation system SYS1 includes the plurality of vehicles 2.

Then, the road surface condition estimating part 112 determines on the basis of the behavior data collected at the step S111 whether or not there is a timing at which the behavior of the vehicle 2 is the first specific behavior to avoid the road surface abnormality during the vehicle 2 traveling (the step S112). In other words, the road surface condition estimating part 112 determines on the basis of the behavior data collected at the step S111 whether or not there is a timing at which the behavior of the vehicle 2 is the first specific behavior that is expected to be taken by the vehicle 2 to avoid road surface abnormality when the vehicle 2 encounters the road surface abnormality during the vehicle 2 traveling (the step S112). Namely, the road surface condition estimating part 112 determines on the basis of the behavior data collected at the step S111 whether or not the first specific behavior is detected during the vehicle 2 traveling (the step S112).

For example, there is a possibility that the vehicle 2 travels to dodge the road surface abnormality in order to avoid the collision with the road surface abnormality (alternatively, to avoid the traveling on the road at which there exists the road surface abnormality, the same applies to the following description). Therefore, a behavior that the vehicle 2 that has traveled straightforwardly (alternatively, along a driving lane) suddenly turns either one of rightward and leftward to dodge something, then returns to the previously traveled route by turning the other one of rightward and leftward and then continues to travel straightforwardly (alternatively, to travel along the driving lane) again is one example of the first specific behavior to avoid the road surface abnormality. Alternatively, there is a possibility that the vehicle 2 goes over (in other words, crosses) a while line representing the driving lane as a result of the vehicle 2 traveling to avoid the road surface abnormality. Therefore, a behavior that the LDA system suddenly operates on the vehicle 2 that has traveled straightforwardly (alternatively, along a driving lane) and then the vehicle 2 continues to travel straightforwardly (alternatively, to travel along the driving lane) again is another one example of the first specific behavior to avoid the road surface abnormality. Alternatively, there is a possibility that the vehicle 2 decelerate rapidly or stops suddenly in order to avoid the collision with the road surface abnormality. Therefore, a behavior that the vehicle 2 that has traveled straightforwardly (alternatively, along a driving lane) decelerates rapidly or stops suddenly is another one example of the first specific behavior to avoid the road surface abnormality. Alternatively, there is a possibility that the vehicle 2 suddenly turns rightward or leftward without the operation of the turn indicator in order to avoid the collision with the road surface abnormality. Therefore, a behavior that the vehicle 2 that has traveled straightforwardly (alternatively, along a driving lane) suddenly turns rightward or leftward without the operation of the turn indicator is another one example of the first specific behavior to avoid the road surface abnormality. Note that the first specific behavior may be set in advance on the basis of a result of at least one of an experiment, a simulation and so on.

At the step S112, the road surface condition estimating part 112 substantially determines on the basis of the behavior data collected at the step S111 whether or not there is a timing at which an abnormality condition (in other words, an abnormality requirement) #1 set on the basis of the first specific behavior (specifically, the abnormality condition #1 that the behavior of the vehicle 2 is the first specific behavior) is satisfied during the vehicle 2 traveling. Namely, the road surface condition estimating part 112 substantially determines on the basis of the behavior data collected at the step S111 whether or not the abnormality condition #1 is satisfied during the vehicle 2 traveling. In this case, the operation of determining whether or not there is the timing at which the behavior of the vehicle 2 is the first specific behavior at the step S112 is substantially equivalent to the operation of determining whether or not there is the timing at which the abnormality condition #1 is satisfied. Moreover, the operation of determining whether or not the first specific behavior is detected at the step S112 is substantially equivalent to the operation of determining whether or not the abnormality condition #1 is satisfied. Note that the abnormality condition #1 corresponds to a condition that is likely satisfied when the vehicle 2 encounters the road surface abnormality and avoids the road surface abnormality and that is not satisfied or that is not easily satisfied when the vehicle 2 does not encounter the road surface abnormality (especially, the vehicle 2 does not avoid the road surface abnormality).

As a result of the determination at the step S112, it is determined that there is the timing at which the behavior of the vehicle 2 is the first specific behavior (namely, there is the timing at which the abnormality condition #1 is satisfied) (the step S112: Yes), there is a relatively high possibility that the vehicle 2 travels on the road at which there exists the road surface abnormality. Namely, there is a relatively high possibility that there exists the road surface abnormality at a position where the behavior of the vehicle 2 is the first specific behavior (namely, the abnormality condition #1 is satisfied). Thus, the road surface condition estimating part 112 specifies, on the basis of the vehicle position data, the position where the behavior of the vehicle 2 is the first specific behavior and estimates that there exists the road surface abnormality at the specified position (the step S113). A road surface abnormality position data relating to the position at which it is estimated at the step S113 that there exists the road surface abnormality may be stored by the storage apparatus 12 as at least one portion of a road surface condition data relating to the condition of the road surface.

On the other hand, as a result of the determination at the step S112, it is determined that there is not the timing at which the behavior of the vehicle 2 is the first specific behavior (the step S112: No), there is a relatively small possibility that the vehicle 2 travels on the road at which there exists the road surface abnormality. Namely, there is a relatively high possibility that the vehicle 2 travels on the road at which there is not the road surface abnormality. In other words, there is a relatively high possibility that the condition of the road on which the vehicle 2 travels is normal. Thus, in this case, the road surface condition estimating part 112 may not execute the process at the step S113. In this case, the road surface condition estimating part 112 may generate, as at least one portion of the road surface condition data relating to the condition of the road surface, a road surface normal position information indicating that the condition of the road on which the vehicle 2 travels is normal. The road surface normal position information may be stored by the storage apparatus 12.

(1-2-2) Flow of Second Road Surface Condition Estimation Operation

Figure 3:
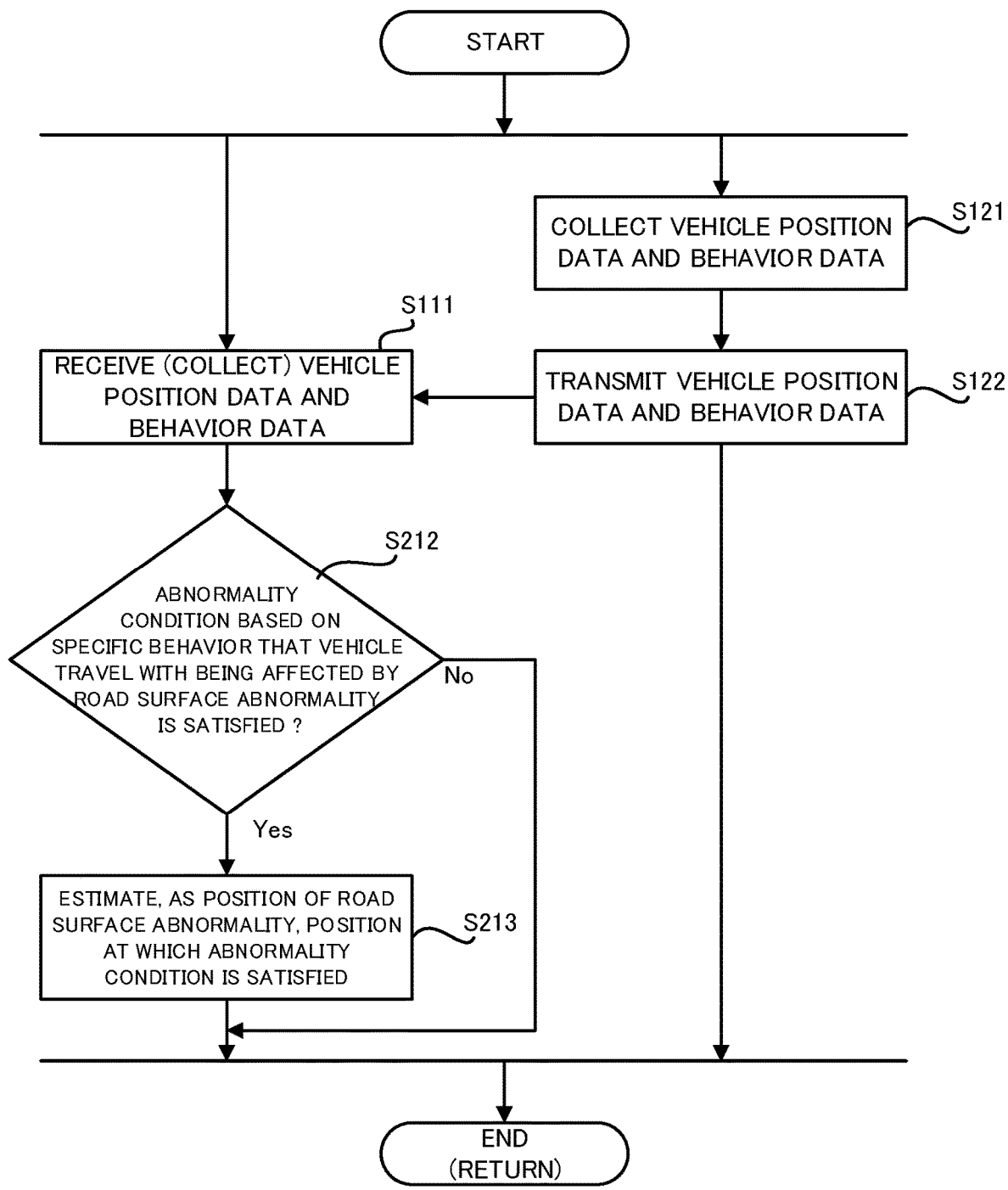
FIG. 3 is a flowchart that illustrates one example of a flow of a second road surface condition estimation operation executed by the road surface condition estimation system in the first embodiment.

Next, with reference to FIG. 3, a flow of the second road surface condition estimation operation will be described. FIG. 3 is a flowchart that illustrates one example of the flow of the second road surface condition estimation operation executed by the road surface condition estimation system SYS1 in the first embodiment. Note that a detailed description of a process that is same as the process in the above described first road surface condition estimation operation illustrated in FIG. 2 will be omitted by assigning the same step number thereto.

As illustrated in FIG. 3, the data collecting part 231 of each vehicle 2 collects the vehicle position data relating to the current position of each vehicle 2 and the behavior data relating to the behavior of each vehicle 2, also in the second road surface condition estimation operation (the step S121). Moreover, the data transmittance controlling part 232 transmits, to the server 1, the vehicle position data and the behavior data collected at the step S121 (the step S122). The server 1 (especially, the data collecting part 111) receives (namely, collects) the vehicle position data and the behavior data transmitted by the vehicle 2 at the step S122 (the step S111).

Then, the road surface condition estimating part 112 determines on the basis of the behavior data collected at the step S111 whether or not there is a timing at which an abnormality condition #2 is satisfied (a step S212). The abnormality condition #2 is set on the basis a second specific behavior. The second specific behavior is a behavior that the vehicle 2 travels with the vehicle 2 being affected by the road surface abnormality. The second specific behavior is a behavior that is expected to be taken by the vehicle 2 when the vehicle 2 travels with the vehicle 2 being affected by the road surface abnormality. The second specific behavior is a behavior that is expected as the behavior of the vehicle 2 traveling with the vehicle 2 being affected by the road surface abnormality when the vehicle 2 encounters the road surface abnormality. Namely, the road surface condition estimating part 112 determines on the basis of the behavior data collected at the step S111 whether or not the abnormality condition #2 is satisfied during the vehicle 2 traveling (the step S212). Note that the abnormality condition #2 corresponds to a condition that is likely satisfied when the vehicle 2 encounters the road surface abnormality and travels with the vehicle 2 being affected by the road surface abnormality and that is not satisfied or that is not easily satisfied when the vehicle 2 does not encounter the road surface abnormality (especially, the vehicle 2 does not travel with the vehicle 2 being affected by the road surface abnormality).

As a result of the determination at the step S212, it is determined that there is the timing at which the abnormality condition #2 is satisfied (the step S212: Yes), there is a relatively high possibility that the vehicle 2 travels on the road at which there exists the road surface abnormality. Namely, there is a relatively high possibility that there exists the road surface abnormality at a position where the abnormality condition #2 is satisfied. Thus, the road surface condition estimating part 112 specifies, on the basis of the vehicle position data, the position where the abnormality condition #2 is satisfied and estimates that there exists the road surface abnormality at the specified position (the step S213). The road surface abnormality position data relating to the position at which it is estimated at the step S213 that there exists the road surface abnormality may be stored by the storage apparatus 12 as at least one portion of the road surface condition data relating to the condition of the road surface.

On the other hand, as a result of the determination at the step S212, it is determined that there is not the timing at which the abnormality condition #2 is satisfied (the step S212: No), there is a relatively small possibility that the vehicle 2 travels on the road at which there exists the road surface abnormality. Thus, in this case, the road surface condition estimating part 112 may not execute the process at the step S213. In this case, the road surface condition estimating part 112 may generate, as at least one portion of the road surface condition data relating to the condition of the road surface, the road surface normal position information indicating that the condition of the road on which the vehicle 2 travels is normal. The road surface normal position information may be stored by the storage apparatus 12.

In the first embodiment, at least one of below described three abnormality conditions #21, #22 and #23 may be used as one example of the abnormality condition #2. In the following description, the abnormality conditions #21, #22 and #23 will be described in order.

(1-2-2-1) Abnormality Condition #21 Based on Second Specific Behavior

The abnormality condition #2 may include the abnormality condition #21 that the behavior of the vehicle 2 is the second specific behavior. In this case, the road surface condition estimating part 112 substantially determines on the basis of the behavior data collected at the step S111 at the step S212 whether or not there is the timing at which the behavior of the vehicle 2 is the second specific behavior during the vehicle 2 traveling. Namely, the road surface condition estimating part 112 substantially determines on the basis of the behavior data collected at the step S111 at the step S212 whether or not the second specific behavior is detected during the vehicle 2 traveling. In this case, the operation of determining whether or not there is the timing at which the abnormality condition #2 (specifically, the abnormality condition #21) is satisfied at the step S212 is substantially equivalent to the operation of determining whether or not there is the timing at which the behavior of the vehicle 2 is the second specific behavior. Moreover, the operation of determining whether or not the abnormality condition #2 is satisfied at the step S212 is substantially equivalent to the operation of determining whether or not the second specific behavior is detected.

For example, when the vehicle 2 travels with the vehicle 2 being affected by the road surface abnormality, there is a possibility that the vehicle 2 vibrates up and down and/or from side to side relatively largely, compared to the case where the vehicle 2 travels with the vehicle 2 not being affected by the road surface abnormality. Especially, when the road surface abnormality is an abnormality that results in (in other words, leads to (unevenness of the road surface (for example, at least one of the depression of the road surface, the hole at the road surface, the bump of the road surface, the falling object, the mass of the peeled asphalt or the like, the falling rock, the dead animal and the like), there is a possibility that the vehicle 2 vibrates up and down and/or from side to side relatively largely. Thus, a behavior that at least one of a vertical acceleration rate, the lateral acceleration rate, the yaw rate, the yaw angle, the roll angle and the pitch angle of the vehicle 2 varies relatively largely in a relatively short time is one example of the second specific behavior.

For example, when the vehicle 2 travels with the vehicle 2 being affected by the road surface abnormality, there is a possibility that the vehicle 2 skids (in other words, slips), compared to the case where the vehicle 2 travels with the vehicle 2 not being affected by the road surface abnormality. Note that a state where the vehicle 2 skids may mean a state where a slip ratio in a longitudinal direction (in other words, the front to rear direction) or a lateral direction of the vehicle 2 is larger than a predetermined ratio. Thus, a behavior that the vehicle 2 skids is another one example of the second specific behavior. A behavior that the vehicle 2 skids and then travels normally again is another one example of the second specific behavior.

For example, there is a possibility that an amount of a variation per unit time of a wheel speed of a non-driven wheel of the vehicle 2 when the vehicle 2 travels with the vehicle 2 being affected by the road surface abnormality is different from the amount of the variation per unit time of the wheel speed of the non-driven wheel of the vehicle 2 when the vehicle 2 travels with the vehicle 2 not being affected by the road surface abnormality, due to an influence of a force from the road surface abnormality. The non-driven wheel is a wheel to which a driving force is not supplied from a driving power source such as an engine. Note that "the amount of the variation of the wheel speed" means "the amount of the variation per unit time of the wheel speed" in the following description if there is no notation, for the purpose of simple description. Typically, there is a possibility that the amount of the variation per unit time of the wheel speed of the non-driven wheel when the vehicle 2 travels with the vehicle 2 being affected by the road surface abnormality is larger than the amount of the variation per unit time of the wheel speed of the non-driven wheel when the vehicle 2 travels with the vehicle 2 not being affected by the road surface abnormality. Therefore, the road surface condition estimating part 112 must be able to estimate the position of the road surface abnormality on the basis of the amount of the variation of the wheel speed of the non-driven wheel. Thus, a behavior that the amount of the variation per unit time of the wheel speed of the non-driven wheel is equal to or larger than a predetermined amount is another one example of the second specific behavior.

Figure 4:
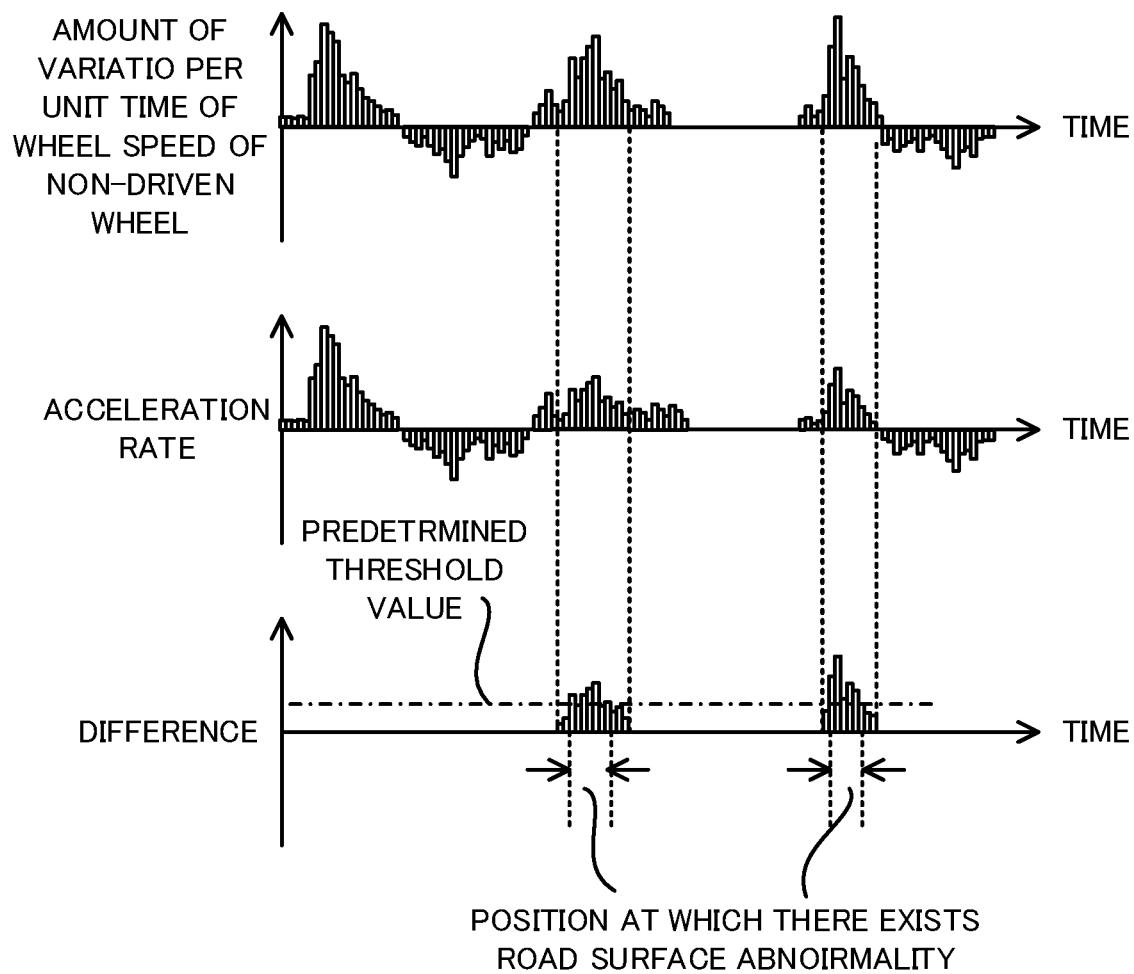
FIG. 4 is a graph that illustrates a time course of a variation amount per unit time of a wheel speed of a non-driven wheel of a vehicle, an acceleration rate of the vehicle and a difference between the variation amount per unit time of the wheel speed of the non-driven wheel of the vehicle and the acceleration rate of the vehicle.

Alternatively, the amount of the variation of the wheel speed of the non-driven wheel includes a component caused by the acceleration rate of the vehicle 2 itself. Note that the acceleration rate of the vehicle 2 is an amount of a variation per unit time of an average value of wheel speeds of a plurality of wheels. Thus, even if the amount of the variation of the wheel speed of the non-driven wheel indicates a sign that is expected to be observed when the vehicle 2 travels at the position where there exists the road surface abnormality, there is a possibility that it is not clear which the sign is a right sign that is caused by the traveling of the vehicle 2 at the position whether there exists the road surface abnormality or a wrong sign that is caused by the acceleration rate of the vehicle 2. Thus, as illustrated in FIG. 4, the road surface condition estimating part 112 may subtract the acceleration rate of the vehicle 2 (see an center graph in FIG. 4) from the amount of the variation of the wheel speed of the non-driven wheel (see an upper graph in FIG. 4), in order to determine whether or not the abnormality condition #21 is satisfied. There is a relatively high possibility that the amount of the variation of the wheel speed of the non-driven wheel from which the acceleration rate of the vehicle 2 is already subtracted (namely, a difference between the amount of the variation of the wheel speed of the non-driven wheel and the acceleration rate of the vehicle 2, and see a lower graph in FIG. 4) is the amount of the variation of the wheel speed of the non-driven wheel that is caused by the traveling of the vehicle 2 at the position whether there exists the road surface abnormality. Namely, there is a relatively high possibility that the vehicle 2 travels at the position whether there exists the road surface abnormality at the timing when the amount of the variation of the wheel speed of the non-driven wheel from which the acceleration rate of the vehicle 2 is already subtracted is equal to or larger than the predetermined amount (in other words, the difference between the amount of the variation of the wheel speed of the non-driven wheel and the acceleration rate of the vehicle 2 is equal to or larger than the predetermined amount). Thus, the road surface condition estimating part 112 estimates the position of the road surface abnormality more accurately by using the amount of the variation of the wheel speed of the non-driven wheel from which the acceleration rate of the vehicle 2 is already subtracted (namely, the difference between the amount of the variation of the wheel speed of the non-driven wheel and the acceleration rate of the vehicle 2), compared to the case where the road surface condition estimating part 112 uses the amount of the variation of the wheel speed of the non-driven wheel from which the acceleration rate of the vehicle 2 is not subtracted yet. Namely, a behavior that the amount of the variation of the wheel speed of the non-driven wheel from which the acceleration rate of the vehicle 2 is already subtracted (namely, the difference between the amount of the variation of the wheel speed of the non-driven wheel and the acceleration rate of the vehicle 2) is equal to or larger than the predetermined amount is another one example of the second specific behavior. Using this second specific behavior results in an improvement of the accuracy of the estimation of the road surface abnormality. In this case, in order to eliminate an influence of a natural frequency (a character frequency) of the vehicle 2 that is relatively low frequency, the road surface condition estimating part 112 may eliminate a variable component due to the natural frequency from the difference between the amount of the variation of the wheel speed of the non-driven wheel and the acceleration rate of the vehicle 2 by using a HPF (High Pass Filter), and then estimate the position of the road surface abnormality on the basis of the difference from which the influence of the natural frequency is already eliminated.

Note that there is a possibility that the amount of the variation of the wheel speed of a driven wheel that is affected by the road surface abnormality is different from the amount of the variation of the wheel speed of the driven wheel that is not affected by the road surface abnormality. The driven wheel is a wheel to which the driving force is supplied from the driving power source such as the engine. However, there is a possibility the difference between the amount of the variation of the wheel speed of the driven wheel that is affected by the road surface abnormality and the amount of the variation of the wheel speed of a driven wheel that is not affected by the road surface abnormality is smaller than the difference between the amount of the variation of the wheel speed of the non-driven wheel that is affected by the road surface abnormality and the amount of the variation of the wheel speed of the non-driven wheel that is not affected by the road surface abnormality, because the driving power is supplied to the driven wheel (namely, the driven wheel is affected by the acceleration rate of the vehicle 2 itself relatively easily). Thus, it is preferable that the behavior based on the amount of the variation of the wheel speed of the non-driven wheel be used in order to improve the accuracy of the estimation of the road surface abnormality, although a behavior based on the amount of the variation of the wheel speed of the driven wheel may be used as one example of the second specific behavior.

For example, when the road surface abnormality is the rut, the lateral acceleration rate of the vehicle 2 at a timing when a tire of the vehicle 2 goes over (in other words, crosses) a side wall of the rut (namely, the tire moves from an outside of a groove of the rut to an inside of the groove or from the inside of the groove to the outside of the groove) becomes larger than the lateral acceleration rate of the vehicle 2 at the other timing. Conversely, when the vehicle 2 travels with the tire not going over the side wall of the rut (in other words, with the tire being in the groove of the rut), the lateral acceleration rate of the vehicle 2 is within a certain range. Thus, the road surface condition estimating part 112 must be able to estimate the position of the road surface abnormality on the basis of the lateral acceleration rate of the vehicle 2. Thus, a behavior that the lateral acceleration rate of the vehicle 2 is within a predetermined range is another one example of the second specific behavior. When a condition that the behavior of the vehicle 2 is this second specific behavior that the lateral acceleration rate of the vehicle 2 is within a predetermined range is used as the abnormality condition #21, the road surface condition estimating part 112 estimates whether or not there exists the rut that is one example of the road surface abnormality.

Figure 5:
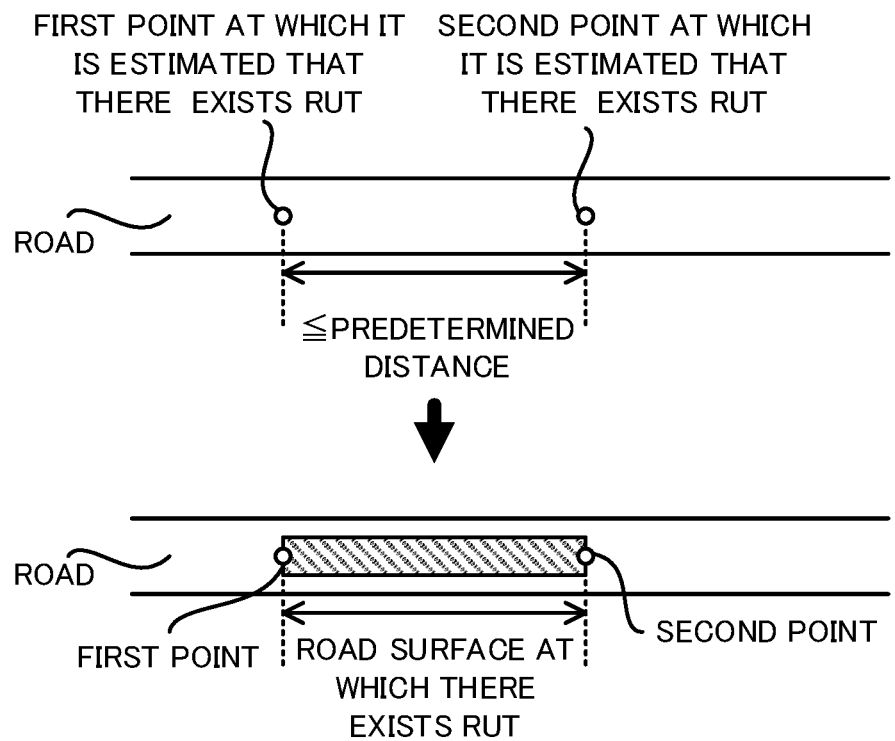
FIG. 5 is a planer view that conceptually illustrates a position at which it is estimated that there exists a rut.

When the road surface condition estimating part 112 estimates that there exists the rut at a first point (namely, a first position or a first location), the road surface condition estimating part 112 may further determine whether or not there exists the rut at a second point (namely, a second position or a second location) and a distance between the first point and the second point is equal to or smaller than a predetermined distance. This determination is executed in order to determine whether or not the rut that is estimated to exists at the first point and the rut that is estimated to exists at the second point constitutes a series of the rut (namely, a continuous one rut). Specifically, there is a relatively high possibility that the rut is typically formed continuously to extend on the road along an extending direction of the road, although the rut may be formed locally at a certain point in some cases. Under this premise, when the distance between the first point and the second point at each of which it is estimated that there exists the rut is equal to or smaller than the predetermined distance, there is a relatively high possibility that the rut that is estimated to exists at the first point and the rut that is estimated to exists at the second point constitutes the series of the rut. Thus, as illustrated in FIG. 5, when it is determined that the distance between the first point and the second point at each of which it is estimated that there exists the rut is equal to or smaller than the predetermined distance, the road surface condition estimating part 112 may estimate that there exists the continuous rut on the road surface from the first point to the second point. On the other hand, when it is determined that the distance between the first point and the second point at each of which it is estimated that there exists the rut is larger than the predetermined distance, the road surface condition estimating part 112 may estimate that the rut that is estimated to exists at the first point and the rut that is estimated to exists at the second point does not constitute the series of the rut. Note that the predetermined distance is a parameter that is used to distinguish a state where there exists a series of rut between two point at each of which it is estimated that there exists the rut (namely, at each of which it is determined that the abnormality condition #21 based on the lateral acceleration rate is satisfied) and a state where there is not a series of rut between two point at each of which it is estimated that there exists the rut (namely, two ruts that exist at two point, respectively, are formed separately) on the basis of the distance between the two point. The predetermined distance may be set to a distance that is expected as a length of a series of rut experimentally, theoretically or by simulation. The predetermined distance may be set to a distance that corresponds to an actually measured length of the actually formed rut.

Note that the second specific behavior may be set in advance on the basis of a result of at least one of an experiment, a simulation and so on, as with the first specific behavior.

(1-2-2-2) Abnormality Condition #22 Based on Second Specific Behavior

The road surface condition estimating part 112 must be able to calculate an index value that represents a degree of a concavity and/or a convexity at the road surface on the basis of the behavior data, because the behavior data includes an information relating to the second specific behavior (namely, an information relating to the behavior of the vehicle 2 that is affected by the road surface abnormality). Thus, the abnormality condition #2 may include an abnormality condition #22 that an average value of the index value at a certain point on the road is equal to or larger than a first predetermined value, in addition to or instead of the above described abnormality condition #21. When the road surface condition estimating part 112 determines that the abnormality condition #22 is satisfied, the road surface condition estimating part 112 estimates that there exists the road surface abnormality (especially, the road surface is rough) at a point on the road at which it is determined that the abnormality condition #22 is satisfied. In this case, the operation of determining whether or not there is the timing at which the abnormality condition #2 (specifically, the abnormality condition #22) is satisfied at the step S212 is substantially equivalent to the operation of determining whether or not the average value of the index value at a certain point on the road is equal to or larger than the first predetermined value.

When the abnormality condition #22 is used, the road surface condition estimating part 112 extracts, from the behavior data, an input information relating to an input from the road surface to the vehicle 2 at the step S212. The input information includes an information representing a variation in time of the wheel speed of each wheel of the vehicle 2. Therefore, when the vehicle 2 is a four-wheel vehicle, the road surface condition estimating part 112 extracts the information representing the variation in time of the wheel speed of each of four wheels (namely, a left front wheel, a right front wheel, a left rear wheel and a right rear wheel). When the vehicle 2 is a two-wheel vehicle, the road surface condition estimating part 112 extracts the information representing the variation in time of the wheel speed of each of two wheels (namely, a front wheel and a rear wheel). However, the input information may include at least one of an information representing a variation in time of the vertical acceleration rate of each wheel of the vehicle 2, an information representing a variation in time of an air pressure of each wheel of the vehicle 2 and so on.

Here, the variation in time of the wheel speed of the vehicle 2 is mainly caused by a pitching, a stroke of a suspension, a torque and the input from the road surface. Namely, the input information includes a component #1 caused by the pitching, a component #2 caused by the stroke of the suspension, a component #3 caused by the torque (namely, caused by an acceleration and a deceleration of the vehicle 2) and a component #4 caused by the input from the road surface (namely, caused by the concavity and/or the convexity at the road surface). Each of these components #1 to #4 is expressed as a wave having a frequency in a specific range. Specifically, the component #1 caused by the pitching is expressed by a wave having a frequency based on the natural frequency of the vehicle 2. The component #2 caused by the stroke of the suspension is expressed by a wave having a frequency based on a stroke variation of the suspension caused by the steering, the acceleration, the deceleration and the like. The component #3 caused by the toque is expressed by a wave that directly represents the component of the variation in time of the wheel speed caused by the torque and that has a frequency based on a variation of the acceleration and the deceleration of the vehicle 2. The component #4 caused by the input from the road surface is expressed by a wave having a frequency that is higher than the waver representing each of the above described components #1 to #3. The inventor of the present invention finds that the frequency range of the wave representing the above described components #1 to #3 is clearly different from the frequency range of the wave representing the component #4 caused by the input from the road surface. Thus, the road surface condition estimating part 112 extracts, from the extracted input information, the component caused by the input from the road surface, by using the fact that the frequency range of the wave representing the above described components #1 to #3 is clearly different from the frequency range of the wave representing the component #4 caused by the input from the road surface. For example, the road surface condition estimating part 112 may extract, from the extracted input information, the component caused by the input from the road surface by using a HPF (High Pass Filter). Here, the component caused by the input from the road surface is extracted for each wheel. This is because the input information includes the information representing the variation in time of the wheel speed of each wheel of the vehicle 2.

Figure 6:
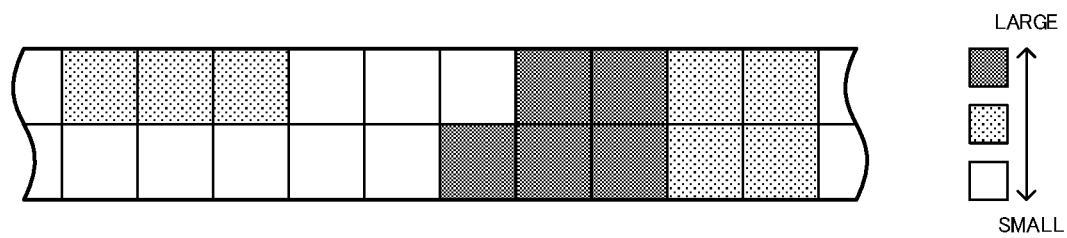
FIG. 6 is a diagram that illustrates an estimated result of a condition of a road surface.

Next, the road surface condition estimating part 112 calculates, on the basis of the extracted component caused by the input from the road surface, a road surface concavity/convexity information that represents the index value representing the degree of the concavity and/or the convexity at the road surface. The index value represented by the road surface concavity/convexity information becomes larger as the degree of the concavity and/or the convexity at the road surface is larger. Next, the road surface condition estimating part 112 calculates the average value of the index value at one point (alternatively, one section) represented by the road surface concavity/convexity information of all of the plurality of vehicles 2. As a result, the condition of the road surface at each point (alternatively, each section) on the road is estimated (see FIG. 6). Note that FIG. 6 illustrates that a gray color of a hatching becomes darker as the average value of the index value becomes larger. Next, the road surface condition estimating part 112 determines whether or not the road surface at one point (alternatively, one section) is rough by comparing the average value of the index value at one point (alternatively, one section) with the first predetermined value. The road surface condition estimating part 112 determines that the road surface at one point (alternatively, one section) is rough when the average value of the index value at one point (alternatively, one section) is equal to or larger than the first predetermined value. Namely, the road surface condition estimating part 112 determines that the road surface at one point (alternatively, one section) is rough when the abnormality condition #22 is satisfied at one point (alternatively, one section).

The first predetermined value is a value for determining whether or not the road surface is rough. The first predetermined value is set in advance to a fixed value or a variable value that varies on the basis of any physical amount or any parameter. The first predetermined value may be set on the basis of a relationship between the index value and the condition of the road surface. The relationship between the index value and the condition of the road surface may be calculated by collecting the index value representing the degree of the concavity and/or the convexity at the road surface while changing the condition of the road surface by an experiment or a simulation. Note that a state where the road surface is rough means a state where the degree of the concavity and/or the convexity is significantly larger than the degree of the concavity and/or the convexity at the timing when the road is constructed.

(1-2-2-3) Abnormality Condition #23 Based on Second Specific Behavior

The abnormality condition #2 may include an abnormality condition #23 that an maximum value of the index value (namely, the index value representing the degree of the concavity and/or the convexity at the road surface) at a certain point on the road is equal to or larger than a second predetermined value, in addition to or instead of at least one of the above described abnormality conditions #21 and #22. When the road surface condition estimating part 112 determines that the abnormality condition #23 is satisfied, the road surface condition estimating part 112 estimates that there exists the road surface abnormality (especially, a local concavity and/or convexity) at a point on the road at which it is determined that the abnormality condition #23 is satisfied. In this case, the operation of determining whether or not there is the timing at which the abnormality condition #2 (specifically, the abnormality condition #23) is satisfied at the step S212 is substantially equivalent to the operation of determining whether or not the maximum value of the index value at a certain point on the road is equal to or larger than the second predetermined value.

When the abnormality condition #23 is used, the road surface condition estimating part 112 calculates the road surface concavity/convexity information that represents the index value represents the degree of the concavity and/or the convexity at the road surface at the step S212, as with the case where the abnormality condition #22 is used. Then, the road surface condition estimating part 112 calculates the maximum value of the index value at one point (alternatively, one section) among the plurality of vehicle 2 on the basis of the road surface concavity/convexity information calculated on the basis of the component that is caused by the input from the road surface and that is extracted from the input information (here, the information representing the variation in time of the wheel speed of each wheel) associated with the vehicle position data representing one point (alternatively, one section). Next, the road surface condition estimating part 112 determines whether or not there exists a pothole (namely, the local concavity and/or convexity or the hole) at the road surface at one point (alternatively, one section) by comparing the maximum value of the index value of each wheel at one point (alternatively, one section) with the second predetermined value. The road surface condition estimating part 112 determines that there exists the pothole at the road surface at one point (alternatively, one section) when the maximum value of the index value of at least one wheel at one point (alternatively, one section) is equal to or larger than the second predetermined value. Namely, the road surface condition estimating part 112 determines that there exists the pothole at the road surface at one point (alternatively, one section) when the abnormality condition #23 is satisfied at one point (alternatively, one section).

The second predetermined value is a value for determining whether or not there exists the local concavity and/or convexity (for example, the pothole). The second predetermined value is set in advance to a fixed value or a variable value that varies on the basis of any physical amount or any parameter. The second predetermined value is larger than the first predetermined value. The second predetermine value may be set to the index value calculated when there exists the pothole at which the maintenance is necessary on the basis of the relationship between the index value and the condition of the road surface. The relationship between the index value and the condition of the road surface may be calculated by collecting the index value representing the degree of the concavity and/or the convexity at the road surface while changing the condition of the road surface by an experiment or a simulation.

(1-3) Technical Effect

As described above, the road surface condition estimation system SYS1 in the first embodiment estimates the condition of the road on the basis of the behavior data transmitted from the plurality of vehicles 2 each which normally travels on the road. Specifically, the road surface condition estimation system SYS1 estimates (namely, specifies) the position of the road surface abnormality on the basis of the behavior data. Thus, the road surface condition estimation system SYS1 estimates the condition of the road surface more easily at lower cost in real time, compared to a case where the condition of the road surface is checked with manpower by using persons and/or vehicles that are used to check the condition of the road surface (for example, seek the road surface abnormality).

Moreover, the road surface condition estimation system SYS1 estimates that there exists the road surface abnormality at the position at which the behavior of the vehicle 2 is the first specific behavior to avoid the road surface abnormality (namely, at which the abnormality condition #1 is satisfied). There is expected to be a relatively high possibility that the behavior of the vehicle 2 at the position at which there exists the road surface abnormality is different from the behavior of the vehicle 2 at the position at which there is not the road surface abnormality in order to avoid the road surface abnormality. Considering this expectation, the road surface condition estimation system SYS1 is capable of appropriately estimating the position of the road surface abnormality on the basis of the behavior of the vehicle 2.

Moreover, the road surface condition estimation system SYS1 estimates that there exists the road surface abnormality at the position at which the behavior of the vehicle 2 is the second specific behavior that the vehicle 2 travels with the vehicle 2 being affected by the road surface abnormality (namely, at which the abnormality condition #21 is satisfied). Moreover, the road surface condition estimation system SYS1 estimates that there exists the road surface abnormality at the position at which the average value of the index value representing the degree of the concavity and/or the convexity at the road surface is equal to or larger than the first predetermined value (namely, at which the abnormality condition #22 is satisfied). Moreover, the road surface condition estimation system SYS1 estimates that there exists the road surface abnormality at the position at which the maximum value of the index value representing the degree of the concavity and/or the convexity at the road surface is equal to or larger than the second predetermined value (namely, at which the abnormality condition #23 is satisfied). There is expected to be a relatively high possibility that the behavior of the vehicle 2 at the position at which there exists the road surface abnormality is different from the behavior of the vehicle 2 at the position at which there is not the road surface abnormality, because the vehicle 2 is affected by the road surface abnormality. There is expected to be a relatively high possibility that the average value of the index value at the position at which there exists the road surface abnormality is different from the average value of the index value at the position at which there is not the road surface abnormality, because the vehicle 2 is affected by the road surface abnormality. There is expected to be a relatively high possibility that the maximum value of the index value at the position at which there exists the road surface abnormality is different from the maximum value of the index value at the position at which there is not the road surface abnormality, because the vehicle 2 is affected by the road surface abnormality. Considering this expectation, the road surface condition estimation system SYS1 is capable of appropriately estimating the position of the road surface abnormality on the basis of the behavior of the vehicle 2.

Moreover, the more the number of the vehicles 2 constituting the road surface condition estimation system SYS1 (namely, the number of the vehicles 2 that transmit the behavior data to the server 1) is, the narrower an area in which all of the vehicles 2 never travel (namely, an area in which the condition of the road surface cannot be estimated on the basis of the behavior of the vehicle 2) is. Thus, the road surface condition estimation system SYS1 is capable of estimating the condition of the road surface in a relatively wide area. Namely, an area in which the road surface abnormality is not recognizable by the road surface condition estimation system SYS1 although there actually exists the road surface abnormality (namely, an area in which the road surface abnormality is not detected) is reduced as much as possible.

Even if there is the area in which all of the vehicles 2 never travel (namely, the area in which the condition of the road surface cannot be estimated on the basis of the behavior of the vehicle 2), the server 1 is capable of easily specifying the area in which all of the vehicles 2 never travel on the basis of the behavior data and the vehicle position data collected from the vehicles 2. Thus, in this case, the server 1 may propose, to a responsible person for checking the condition of the road surface, to check the condition of the road surface only in the specified area with manpower by using the persons and/or the vehicles that are used to check the condition of the road surface. Therefore, the case where the persons and/or the vehicles that are used to check the condition of the road surface are needed is limited. Thus, even if the persons and/or the vehicles that are used to check the condition of the road surface are needed, the cost for checking the condition of the road surface with manpower by using the persons and/or the vehicles that are used to check the condition of the road surface is relatively low.

Moreover, there is higher possibility that the vehicles 2 travel at different positions in the same driving lane, respectively, when the vehicles 2 travel in the same driving lane, as the number of the vehicles 2 becomes larger. For example, there is a relatively high possibility that one vehicle 2 travel at a center position in the driving lane and another vehicle 2 travel at a left or right position in the same driving lane. In this case, the road surface condition estimation system SYS1 is capable of estimating the condition of the road surface in a relatively wide area in the same driving lane. Therefore, an area in the driving lane in which the road surface abnormality is not detected is reduced as much as possible.

Moreover, the more the number of the vehicles 2 is, the more a data amount of behavior data transmitted to the server 1 is. There is a higher possibility that an influence of a noise included in the behavior data is eliminated as the data amount of the behavior data transmitted to the server 1 becomes larger. The noise is a data component relating to behavior that is not distinguishable from the first specific behavior although the data component is transmitted from the vehicle 2 that does not travel in the first specific behavior to avoid the road surface abnormality, for example. Thus, the accuracy of the estimation of the condition of the road surface improves.

Moreover, typically, there is higher possibility that there exists the road surface abnormality on a certain road as the number of the vehicles 2 traveling on this certain road becomes larger. Thus, there is higher requirement for estimating the condition of the road surface on a certain road as the number of the vehicles 2 traveling on this certain road becomes larger. In this case, in the first embodiment, the data amount of the behavior data collected by the road surface condition estimation system SYS1 becomes larger as the number of the vehicles 2 traveling on a certain road becomes larger. Therefore, the road surface condition estimation system SYS1 is capable of estimating the condition of the road surface more appropriately and more accurately in the situation where there is relatively high requirement for estimating the condition of the road surface on a certain road because of the number of the vehicles 2 traveling on this certain road being relatively large.

Figure 7:
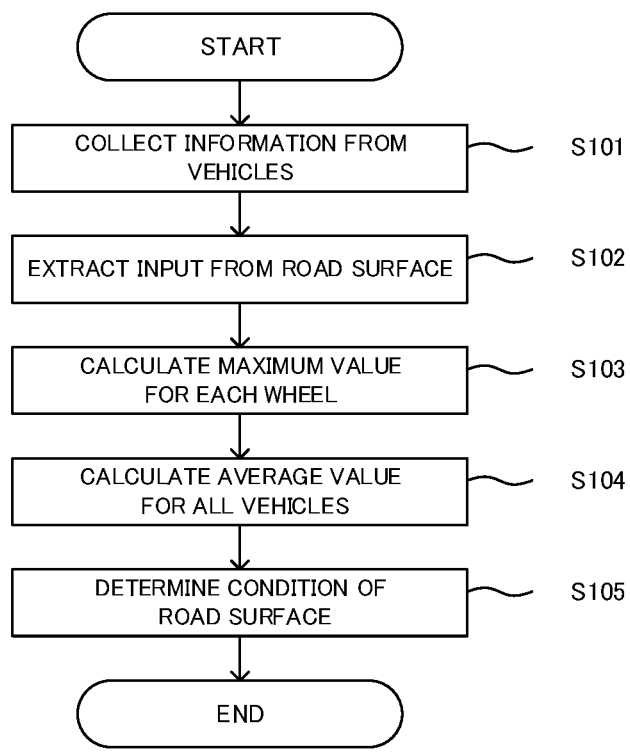
FIG. 7 is a flowchart that illustrates one example of a flow of a modified example of the road surface condition estimation operation executed by the road surface condition estimation system in the first embodiment.

(1-4) Modified Example of Road Surface Condition Estimation Operation (1-4-1) First Modified Example of Road Surface Condition Estimation Operation When the road surface condition estimation system SYS1 estimates the condition of the road surface on the basis of the index value representing the degree of the concavity and/or the convexity at the road surface, the road surface condition estimation system SYS1 may execute the road surface condition estimation operation in accordance with a flowchart illustrated in FIG. 7, instead of the flowchart illustrated in FIG. 3. Moreover, when the road surface condition estimation system SYS1 estimates the condition of the road surface on the basis of the index value representing the degree of the concavity and/or the convexity at the road surface, the road surface condition estimation system SYS1 may have a structure illustrated in FIG. 8, instead of the structure illustrated in FIG. 1.

Figure 8:
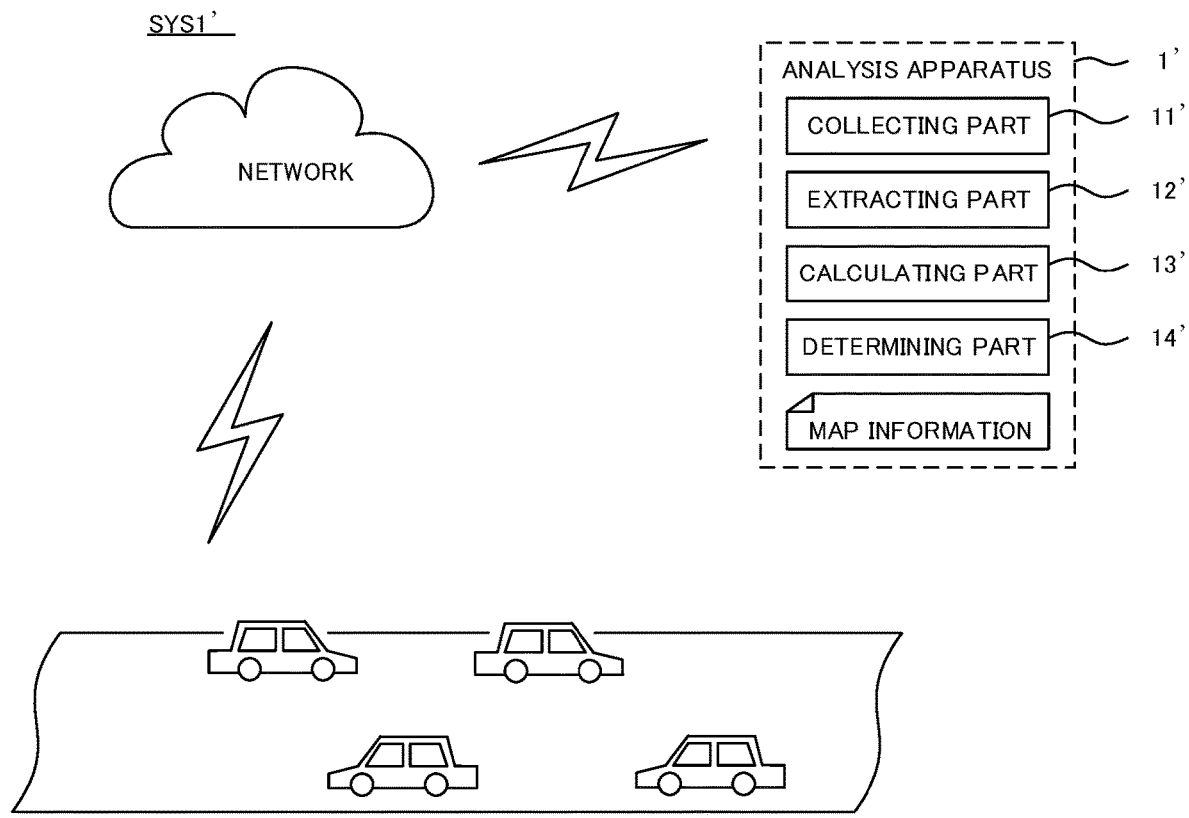
FIG. 8 is a block diagram that illustrates one example of a structure of a modified example of the road surface condition estimation system in the first embodiment.

Specifically, in FIG. 8, a road surface condition estimation system SYS1' in a first modified example is provided with: an analysis apparatus 1'; and a plurality of vehicles each of which is configured to communicate with the analysis apparatus 1' via a network. The analysis apparatus 1' includes, as processing blocks that are logically realized in the analysis apparatus 1' or processing circuits that are physically realized in the analysis apparatus 1', a collecting part 11', an extracting part 12', a calculating part 13' and a determining part 14'. The analysis apparatus 1' further includes a map information. Each of the plurality of vehicles is configured to collect the input information relating to the input from the road surface to the vehicle, associate the input information with a point information representing a point (alternatively, a section) at which the input information is collected, and then transmit the input information. A specific example of the information source of the input information is already described above, and thus its detailed description is omitted. Note that the vehicle in the first modified example has a structure that is same as the structure of the above described vehicle 2.

In this case, as illustrated in FIG. 7, the collecting part 11' of the analysis apparatus 1' collects the input information from each of the plurality of vehicles (a step S101). Note that the process at the step S101 may be executed by the above described data collecting part 111.

Then, the extracting part 12' of the analysis apparatus 1' extracts, from the collected input information, a component caused by the input from the road surface (a step S102). The process of extracting the component caused by the input from the road surface may be same as the above described process, and thus its detailed description is omitted. Note that the process at the step S102 may be executed by the above described road surface condition estimating part 112.

Then, the calculating part 13' of the analysis apparatus 1' calculates the road surface concavity/convexity information that is an index representing the degree of the concavity and/or the convexity at the road surface on the basis of the extracted component caused by the input from the road surface. Moreover, the calculating part 13' calculates the maximum value of the index value of each wheel at one point (alternatively, one section) on the basis of the road surface concavity/convexity information calculated on the basis of the component that is caused by the input from the road surface and that is extracted from the input information associated with the point information representing the one point (alternatively, one section) (a step S103). Moreover, the calculating part 13' calculates the average value of the index value at one point (alternatively, one section) represented by the road surface concavity/convexity information of all of the plurality of vehicles (a step S104). Note that the process relating to the road surface concavity/convexity information may be same as the above described process, and thus its detailed description is omitted. Note that the process from the step S103 to the step S104 may be executed by the above described road surface condition estimating part 112.

Next, the determining part 14' determines (in other words, estimates) the condition of the road surface on the basis of the result of the process at the steps S103 and S104 (a step S105). Specifically, the determining part 14' determines whether or not the road surface at one point (alternatively, one section) is rough by comparing the average value of the index value at one point (alternatively, one section) calculated at the step S104 with the first predetermined value. The determining part 14' determines whether or not there exists the pothole (namely, the local concavity and/or convexity or the hole) at the road surface at one point (alternatively, one section) by comparing the maximum value of the index value of each wheel at one point (alternatively, one section) calculated at the step S103 with the second predetermined value. Note that the process relating to the determination based on the index value may be same as the above described process, and thus its detailed description is omitted. Note that the process at the step S105 may be executed by the above described road surface condition estimating part 112.

Note that the process illustrated in FIG. 7 may be executed without the map information. However, it is preferable that the result of the process illustrated in FIG. 7 be presented with the result of the process being associated with the point on the map represented by the map information, when the result of the process illustrated in FIG. 7 is presented to the user.

According to the road surface condition estimation operation in the first modified example, the condition of the road surface is estimated on the basis of the road surface concavity/convexity information calculated from the input information of each of the plurality of vehicles (here, the information representing the variation in time of the wheel speed of each wheel). Thus, the accuracy of the estimation of the condition of the road surface improves, compared to the case where the condition of the road surface is estimated on the basis of the input information collected from only one vehicle.

Moreover, the road surface condition estimation operation in the first modified example determines the presence of the pothole on the basis of the maximum value of the index value of each wheel of each vehicle that are represented by the road surface concavity/convexity information. A probability that one vehicle travels on the pothole is relatively small, because the pothole is significantly smaller than a width of the road and a width of the vehicle. Namely, it is very difficult to detect the pothole on the basis of the input information collected from only one vehicle. However, since the disclosed road surface condition estimation method collects the input information from the plurality of vehicles, the disclosed road surface condition estimation method detects the pothole relatively easily.

By the way, conventionally, an inspection of the condition of the road surface is performed by a road management authority or by a corporation or a business company delegated by the road management authority. In this case, the inspection of the condition of the road surface at one point on the road is performed about every several months to several years. Moreover, in many cases, the inspection of the condition of the road surface is preferentially performed on a road having a large amount of traffic such as a main line (in other words, a primary road) and the inspection of the condition of the road surface is not performed on the other road in an appropriate cycle. Thus, although the condition of the road surface is deteriorated, it takes a relatively long time to start the maintenance.

Here, the information representing the variation in time of the wheel speed of each wheel, which is one example of the input information necessary for the disclosed road surface condition estimation method, is measured by all of the commonly used vehicles. Moreover, the vehicle having a navigation apparatus has an apparatus such as the GPS that is configured to measure the position of the vehicle as a standard equipment. Namely, when the information representing the variation in time of the wheel speed of each wheel is used as the input information necessary for the disclosed road surface condition estimation method, the input information collected from the vehicle of a citizen who has no relation with the above described road management authority is used to estimate the condition of the road surface. Furthermore, the vehicle of the citizen travels on several roads daily. Thus, when the input information collected from the vehicle of the citizen is used to estimate the condition of the road surface, the inspection of the condition of the road surface can be performed on most of the road. Namely, the disclosed road surface condition estimation method is capable of inspecting the condition of the road surface on most of the road daily. Especially, considering that the number of what we call connected cars (connected vehicles) increases in the future, the disclosed road surface condition estimation method is a very useful practice.

Note that an effect that is same as the effect achievable by executing the road surface condition estimation operation in the first modified example is achievable by executing the above described second road surface condition estimation operation (especially, the second road surface condition estimation operation using at least one of the abnormality conditions #22 and #23 relating to the index value).

(1-4-2) Second Modified Example of Road Surface Condition Estimation Operation

In the above described description, the road surface condition estimating part 112 mainly estimates the position of the road surface abnormality. However, the road surface condition estimating part 112 may estimate any condition of the road surface that is different from the position of the road surface abnormality. For example, the road surface condition estimating part 112 may estimate a degree of a deterioration of the road surface abnormality on the basis of the behavior data. The degree of the deterioration of the road surface abnormality may be a parameter that becomes larger as the road surface abnormality affects the traveling of the vehicle 2 more. In this case, the road surface condition estimating part 112 may estimate the degree of the deterioration of the road surface abnormality on the basis of a relationship information representing a relationship between the behavior data and the degree of the deterioration of the road surface abnormality. The road surface condition estimating part 112 may estimate the degree of the deterioration of the road surface abnormality by using a processing engine (for example, a processing engine using an AI (Artificial Intelligence) such as a neural network) that is configured to output the degree of the deterioration of the road surface abnormality when the behavior data is inputted to the processing engine.

The road surface condition estimating part 112 may specify a progress rate of the deterioration (namely, a deterioration speed) of the road surface by comparing the condition of the road surface at one time with the condition of the road surface at another time on the basis of the road surface condition data representing the estimated result of the condition of the road surface. Moreover, the road surface condition estimating part 112 may predict the condition of the road surface on the road in the future on the basis of the specified progress rate of the deterioration of the road surface.

(1-4-3) Third Modified Example of Road Surface Condition Estimation Operation The road surface condition estimating part 112 may estimate the condition of the road surface on the basis of a result of comparing the condition of the road surface at one point at a certain time with the condition of the road surface at the one point at another time, in addition to the determined result whether or not at least one of the abnormality conditions #1 and #2 is satisfied at one point on the road.

For example, there is a possibility that a structural object (for example, at least one of a joint between roads and a maintenance hole) that is formed on the road on which the vehicle 2 is allowed to travel applies a force to the vehicle 2 traveling on the structural object. Thus, there is a possibility that it is determined apparently that at least one of the abnormality conditions #1 and #2 is satisfied on the basis of the behavior data of the vehicle 2 traveling on the structural object. As a result, there is a possibility that the accuracy of the estimation of the condition of the road surface deteriorates. On the other hand, the behavior of the vehicle 2 traveling on the structural object at one time is usually to be same as the behavior of the vehicle 2 traveling on the structural object at another time. This is because the structural object does not deteriorate easily than the road surface. Thus, when the behavior of the vehicle 2 traveling on one point at one time is different from the behavior of the vehicle 2 traveling on the same one point at another time under the situation where it is determined that at least one of the abnormality conditions #1 and #2 is satisfied at the same one point, there is a relatively high possibility that the difference of the behavior between the one time and the another time is caused by not the structural object formed on the road but the road surface abnormality. On the other hand, when the behavior of the vehicle 2 traveling on one point at one time is same as the behavior of the vehicle 2 traveling on the same one point at another time under the situation where it is determined that at least one of the abnormality conditions #1 and #2 is satisfied at the same one point, there is a relatively high possibility that the difference of the behavior between the one time and the another time is caused by the structural object formed on the road. Therefore, the road surface condition estimating part 112 may estimate that there exists the road surface abnormality at one point when at least one of the abnormality conditions #1 and #2 is satisfied and the difference between the behavior of the vehicle 2 traveling on the same one point at one time and the behavior of the vehicle 2 traveling on the same one point at another time is larger than a predetermined time. Namely, the road surface condition estimating part 112 may estimate that there exists the road surface abnormality at one point when at least one of the abnormality conditions #1 and #2 is satisfied and it is considered that the behavior of the vehicle 2 traveling on the same one point at one time is significantly different from the behavior of the vehicle 2 traveling on the same one point at another time. On the other hand, the road surface condition estimating part 112 may estimate that there is not the road surface abnormality at one point when at least one of the abnormality conditions #1 and #2 is satisfied and the difference between the behavior of the vehicle 2 traveling on the same one point at one time and the behavior of the vehicle 2 traveling on the same one point at another time is smaller than the predetermined time. Namely, the road surface condition estimating part 112 may estimate that there exists the road surface abnormality at one point when at least one of the abnormality conditions #1 and #2 is satisfied and it is considered that the behavior of the vehicle 2 traveling on the same one point at one time is substantially same as the behavior of the vehicle 2 traveling on the same one point at another time. Note that a state where the behavior at one time is same as the behavior at another time includes not only a state where the behavior at one time is exactly same as the behavior at another time but also a state where it is considered that the behavior at one time is substantially same as the behavior at another time although the behavior at one time is different from the behavior at another time.

In this case, it is preferable that a time interval between one time and another time be a time interval corresponding to a predetermined time (in other words, a time length) that is enough for the deterioration of the road to progress due to the traveling of the vehicle 2. As a result, there is estimated to be a relatively high possibility that the state where the behavior of the vehicle 2 traveling on one point at one time is different from the behavior of the vehicle 2 traveling on the same one point at another time is caused by the road surface abnormality. Namely, there is estimated to be a relatively high possibility that the state where the behavior of the vehicle 2 traveling on one point at one time is same as the behavior of the vehicle 2 traveling on the same one point at another time is caused by the structural object formed on the road.

However, the structural object formed on the road may deteriorates due to the usage of the structural object for a long period, although the structural object does not deteriorate easily. Even in this case, there is a relatively high possibility that the behavior of the vehicle 2 traveling on a certain structural object at one time is different from the behavior of the vehicle 2 traveling on the same structural object at another time due to the deterioration of the structural object. As a result, there is a relatively high possibility that it is estimated that there exists the road surface abnormality at the position of the structural object. Thus, the road surface condition estimation operation in the third modified example improves the accuracy of the estimation of the road surface abnormality and is capable of appropriately estimating the deterioration of the structural object that is formed on the road and on which the vehicle 2 is allowed to travel.

Alternatively, the road surface condition estimating part 112 may estimate that there is a high possibility that the road surface abnormality will arise in the near future at a position where the behavior of the vehicle 2 gradually changes to be close to the first or second specific behavior although the behavior of the vehicle 2 is not yet same as the first or second specific behavior. For example, the road surface condition estimating part 112 may estimate that there is a high possibility that the road surface abnormality will arise in the near future at a position where the behavior of the vehicle 2 traveling on one point at one time is closer to the first or second specific behavior than the behavior of the vehicle 2 traveling on the same one point at another time is, wherein the one time is before the another time. Alternatively, the road surface condition estimating part 112 may estimate that there is a high possibility that the road surface abnormality will arise in the near future at a position where the behavior of the vehicle 2 gradually changes to be close to a behavior that is expected to be taken by the vehicle 2 when at least one of the abnormality conditions #1 and #2 is satisfied although at least one of the abnormality conditions #1 and #2 is not yet satisfied.

(1-4-4) Fourth Modified Example of Road Surface Condition Estimation Operation When the road surface condition estimating part 112 estimates the condition of the road surface by focusing on the second specific behavior, the road surface condition estimating part 112 may estimate the condition of the road surface by using an estimation engine (for example, an estimating engine using an AI (Artificial Intelligence) such as a neural network) that is configured to output a probability that the vehicle 2 travels with the vehicle 2 being affected by the road surface abnormality when the behavior data (namely, the data transmitted from the vehicles 2) is inputted to the estimation engine. In this case, it is possible to appropriately distinguish, as a state where the behavior of the vehicle 2 is the behavior that is expected to be taken by the vehicle 2 when the abnormality condition #2 is satisfied, a state where the behavior of the vehicle 2 is the behavior that is expected to be taken by the vehicle 2 when the abnormality condition #2 is satisfied due to the vehicle 2 traveling with the vehicle 2 being actually affected by the road surface abnormality from a state where the behavior of the vehicle 2 is apparently the behavior that is expected to be taken by the vehicle 2 when the abnormality condition #2 is satisfied although the vehicle 2 travels with the vehicle 2 not being actually affected by the road surface abnormality, by executing a learning process using a learning data such as the behavior data on the estimating engine. Specifically, for example, it is possible to appropriately distinguish, as a state where the behavior of the vehicle 2 is the second specific behavior, a state where the behavior of the vehicle 2 is the second specific behavior due to the vehicle 2 traveling with the vehicle 2 being actually affected by the road surface abnormality from a state where the behavior of the vehicle 2 is apparently the second specific behavior although the vehicle 2 travels with the vehicle 2 not being actually affected by the road surface abnormality. As a result, the accuracy of the estimation of the condition of the road surface improves.

Note that the road surface condition estimating part 112 may estimate the condition of the road surface by using an estimation engine (for example, an estimating engine using an AI (Artificial Intelligence) such as a neural network) that is configured to output a probability that the vehicle 2 travels to avoid the road surface abnormality when the behavior data (namely, the data transmitted from the vehicles 2) is inputted to the estimation engine, even when the road surface condition estimating part 112 estimates the condition of the road surface by focusing on the first specific behavior.

(2) ROAD SURFACE CONDITION ESTIMATION SYSTEM SYS IN SECOND EMBODIMENT

Next, the road surface condition estimation system SYS in a second embodiment will be described. Note that the road surface condition estimation system SYS in the second embodiment is referred to as a "road surface condition estimation system SYS2" in the following description.

(2-1) Structure of Road Surface Condition Estimation System SYS2

Figure 9:
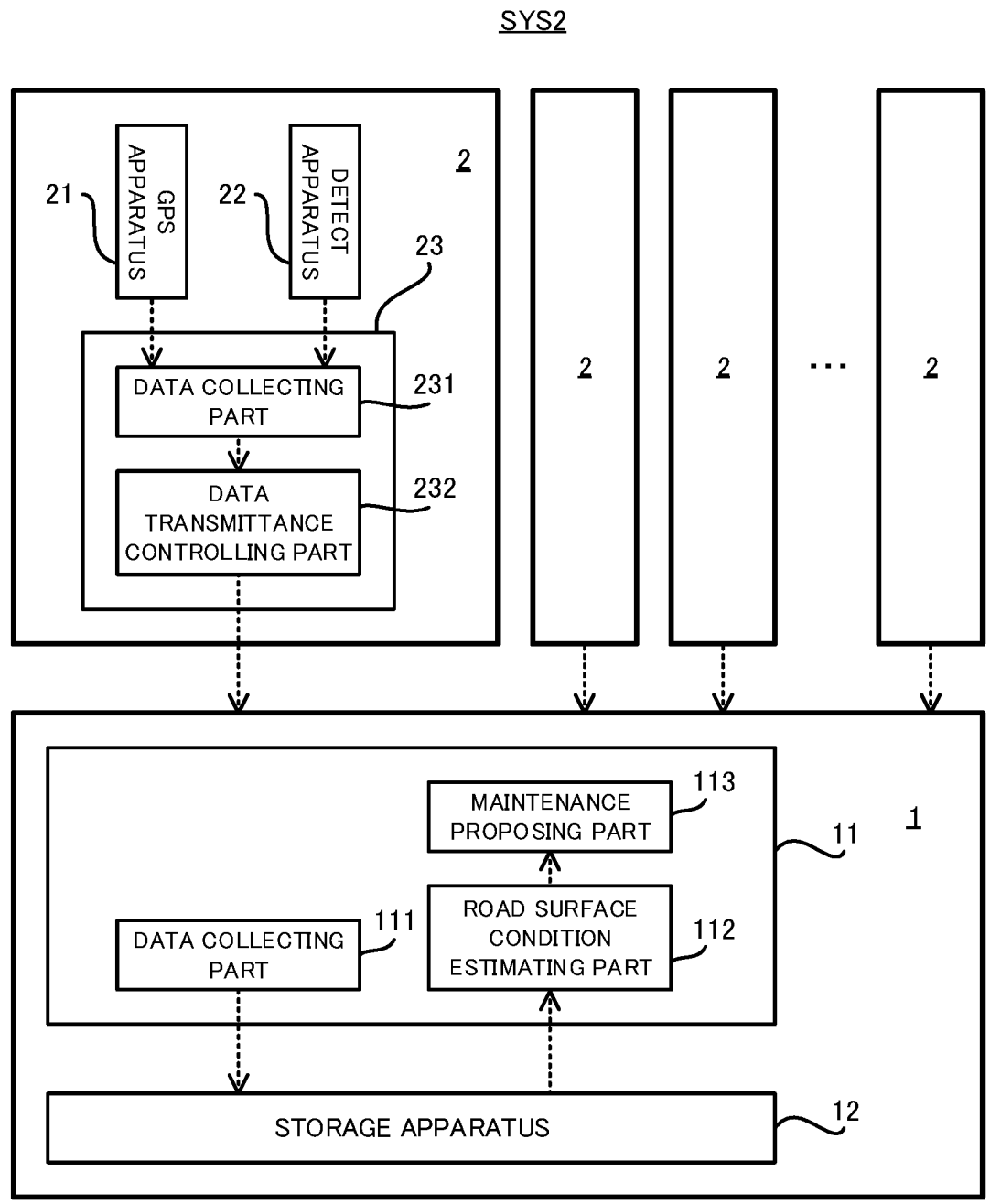
FIG. 9 is a block diagram that illustrates one example of a structure of the road surface condition estimation system in a second embodiment.

Firstly, with reference to FIG. 9, the structure of the road surface condition estimation system SYS2 in the second embodiment will be explained. FIG. 9 is a block diagram that illustrates the structure of the road surface condition estimation system SYS2 in the second embodiment. Note that a detailed description of a component that is same as the component of the above described road surface condition estimation system SYS1 in the first embodiment will be omitted by assigning the same reference number thereto.

As illustrated in FIG. 9, the road surface condition estimation system SYS2 is different from the above described road surface condition estimation system SYS1 in the first embodiment in that the information processing apparatus 11 further includes, as a processing block that is logically realized in the information processing apparatus 11 or a processing circuit that is physically realized in the information processing apparatus 11, a maintenance proposing part 113 that is one specific example of a "proposing device" in the below described additional statement. Another feature of the road surface condition estimation system SYS2 may be same as the above described road surface condition estimation system SYS1.

The maintenance proposing part 113 is configured to execute a maintenance proposal operation for proposing a maintenance of the road on the basis of the estimated result of the road surface condition estimating part 112 (namely, the road surface condition data). The proposal of the maintenance of the road may include at least one of a generation and an output (for example, an output to a display) of an information relating to the maintenance of the road, for example. The information relating to the maintenance of the road may include at least one of an information relating to a position of the road surface that is desired to be maintained, an information relating to a condition of the road surface that is desired to be maintained, an information relating to a timing at which the road surface is desired to be maintained, an information relating to the road surface abnormality that exists on the road surface, an information relating to an urgency of the maintenance, an information that is useful for preparing a plan of the maintenance of the road surface, an information relating to the plan of the maintenance of the road surface and an information that is useful for actually maintaining the road surface, for example. The maintenance proposing part 113 may propose the maintenance of the road to at least one of a user of the road surface condition estimation system SYS2, a responsible person for preparing the plan of the maintenance of the road surface and a responsible person for actually maintaining the road.

(2-2) Maintenance Proposal Operation

Next, a specific content of the maintenance proposal operation executed by the maintenance proposing part 113 will be further described.

The maintenance proposing part 113 may execute the maintenance proposal operation on the basis of an abnormality position information relating to the positon of the road surface abnormality included in the road surface condition data. Specifically, the maintenance proposing part 113 may propose the maintenance of the road surface at the position of the road surface abnormality.

The maintenance proposing part 113 may execute the maintenance proposal operation on the basis of a deterioration degree information relating to the degree of the deterioration of the road surface included in the road surface condition data. Specifically, the maintenance proposing part 113 may propose the maintenance of the road surface at a position at which the degree of the deterioration of the road surface is equal to or larger than a predetermined threshold value. In this case, the predetermined threshold value may be a fixed value or a variable value that is variable depending on the situation. Note that the predetermined threshold value may be set to a value smaller than an upper limit that may be set to the degree of the deterioration of the road surface in the case where the road surface is not deteriorated as much as the road surface that leads to a large trouble of the traveling of the vehicle 2.

When the predetermined threshold value is the variable value, the maintenance proposing part 113 may vary the predetermined threshold value. For example, the maintenance proposing part 113 may vary the predetermined threshold value on the basis of the road surface condition data. As one example, the maintenance proposing part 113 may vary the predetermined threshold value on the basis of a deterioration speed information relating to the deterioration speed of the road surface included in the road surface condition data. In this case, for example, the maintenance proposing part 113 may vary the predetermined threshold value so that the predetermined threshold value that is used to determine whether to propose the maintenance of the road surface at a certain point becomes smaller as the deterioration speed of the road surface at the same certain point becomes faster. As a result, the maintenance of the road surface at a point where the deterioration speed is relatively fast is proposed more preferentially or sooner than the maintenance of the road surface at a point where the deterioration speed is relatively slow. Therefore, the maintenance proposing part 113 is capable of proposing the maintenance of the road surface before the deterioration of the road surface progresses to lead to the large trouble of the traveling of the vehicle 2.

The deterioration speed of the road surface that freezes easily is usually faster than the deterioration speed of the road surface that does not freeze. Thus, the maintenance proposing part 113 may vary the predetermined threshold value on the basis of an information relating to an easiness of freezing of the road surface, in addition to or instead of the road surface condition data. For example, the maintenance proposing part 113 may vary the predetermined threshold value so that the predetermined threshold value that is used to determine whether to propose the maintenance of the road surface at a certain point becomes smaller as the road surface at the same certain point freezes more easily. Even in this case, the maintenance of the road surface at a point where the road surface freezes relatively easily (namely, the deterioration speed is relatively fast) is proposed more preferentially or sooner than the maintenance of the road surface at a point where the road surface does not freezes easily (namely, the deterioration speed is relatively slow). Note that an information relating to at least one of a temperature, an altitude and a weather at a point of the road surface may be used as one example of the information relating to the easiness of freezing of the road surface. This is because the road surface at a certain point freezes more easily as the temperature at the same certain point becomes lower, the road surface at a certain point freezes more easily as the altitude at the same certain point becomes higher and the road surface at a certain point freezes more easily when it snows at the same certain point.

The maintenance proposing part 113 is capable of estimating whether or not the degree of the deterioration of the road surface at a certain point rapidly increases, or gradually (in other words, mildly) increases or does not increase (namely, does not vary) on the basis of the deterioration speed information included in the road surface condition data. Alternatively, even if the road surface condition data does not include the deterioration speed information, when the road surface condition data includes the information relating to the degree of the deterioration of the road surface at a certain point at one time and the information relating to the degree of the deterioration of the road surface at the same certain point at another time, the maintenance proposing part 113 is capable of estimating whether or not the degree of the deterioration of the road surface at the certain point rapidly increases, or gradually increases or does not increase. In this case, the maintenance proposing part 113 may preferentially propose the maintenance of the road surface at which the degree of the deterioration rapidly increases. As a result, the maintenance proposing part 113 is capable of proposing the maintenance of the road surface before the deterioration of the road surface progresses to lead to the large trouble of the traveling of the vehicle 2. Moreover, the maintenance proposing part 113 may not propose the maintenance of the road surface at which the degree of the deterioration gradually increases. However, the maintenance proposing part 113 may inform that the maintenance of the road surface at which the degree of the deterioration gradually increases will be needed in the future before the maintenance of the road surface at which the degree of the deterioration gradually increases is actually needed. As a result, a person responsible for the maintenance of the road surface may secure a budget to prepare the future maintenance of the road surface and/or prepare the plan of the maintenance of the road surface in advance.

As described above, the road surface condition estimating part 112 is capable of predicting the condition of the road surface on the road in the future on the basis of the progress rate of the deterioration of the road surface. In this case, the maintenance proposing part 113 may inform a future necessity of the maintenance in advance on the basis of the predicted result of the condition of the road surface in the future. As a result, the person responsible for the maintenance of the road surface may secure the budget to prepare the future maintenance of the road surface and/or prepare the plan of the maintenance of the road surface in advance. Alternatively, the maintenance proposing part 113 may propose the maintenance of the road surface before the road surface abnormality that leads to the large trouble of the traveling of the vehicle 2 arises (alternatively, the deterioration of the road surface progresses to lead to the large trouble of the traveling of the vehicle 2), on the basis of the predicted result of the condition of the road surface in the future. As a result, the maintenance proposing part 113 is capable of proposing the maintenance of the road surface before the deterioration of the road surface progresses to lead to the large trouble of the traveling of the vehicle 2.

It can be said that the maintenance proposal operation executed by the maintenance proposing part 113 is one example of operation using the estimated result of the road surface condition estimating part 112. Thus, the maintenance proposing part 113 may execute another operation using the estimated result of the road surface condition estimating part 112 in addition to or instead of the maintenance proposal operation.

Figure 10:
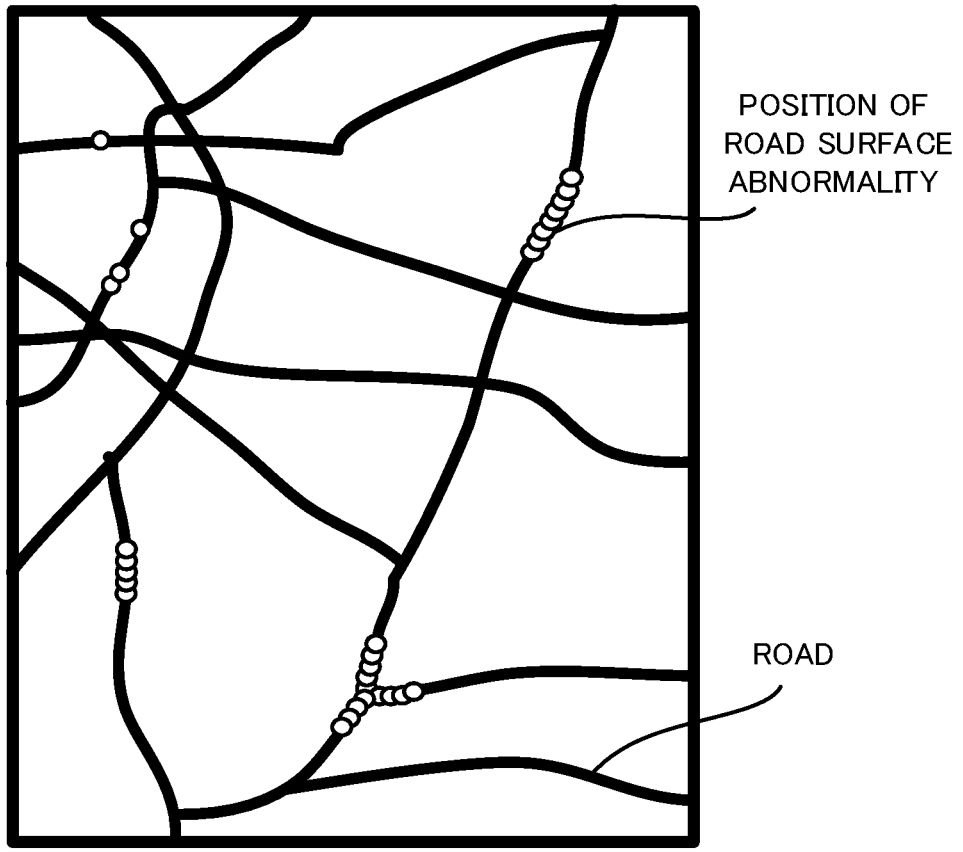
FIG. 10 is a planner view that illustrates a map on which a road surface abnormality is visualized.

For example, as illustrated in FIG. 10, the maintenance proposing part 113 may plot a point of the road surface abnormality on a map on the basis of the road surface condition data. Namely, the maintenance proposing part 113 may generate the map in which the point of the road surface abnormality is visualized on the basis of the road surface condition data. In this case, the server 1 may generate the map in which the point of the road surface abnormality is visualized by plotting the point of the road surface abnormality on a layer corresponding to the map on the basis of the road surface condition data.

When the maintenance proposing part 113 generates the map in which the point of the road surface abnormality is visualized, the maintenance proposing part 113 may further overlay a first layer at which the point of the road surface abnormality is plotted on a second layer at which another information that is different from the information included in the first layer (namely, the information relating to the condition of the road surface) to thereby generate a map having a multi-layered structure (namely, a changeable map including the information that is changeable depending on the usage of the map) in which another information as well as the point of the road surface abnormality are visualized. The map generated by the maintenance proposing part 113 may be displayed on a display.

Figure 11:
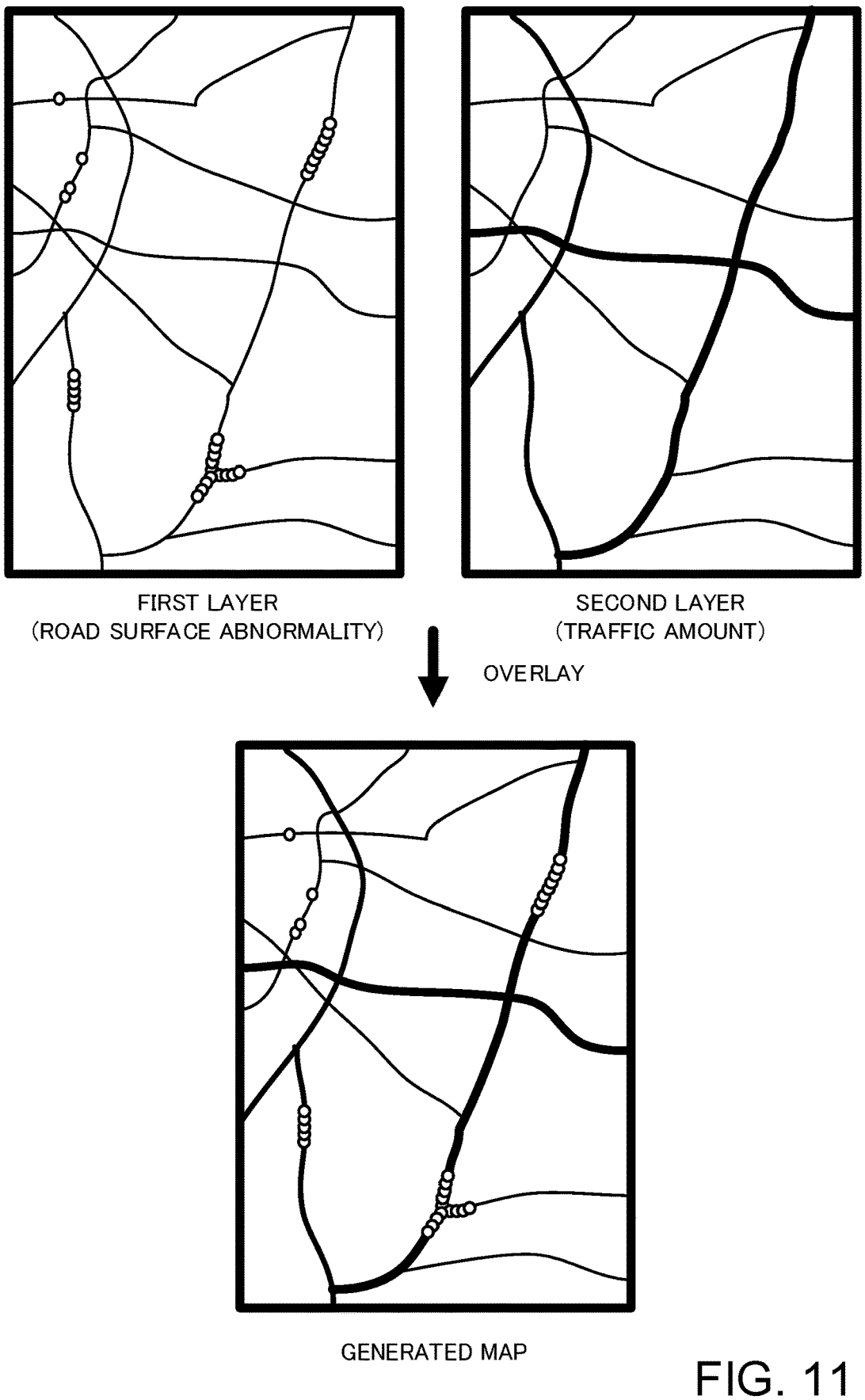
FIG. 11 is a planner view that illustrates a map generated by overlaying a first layer on which positions of the road surface abnormality are plotted on a second layer on which a traffic is visualized.

An information relating to a traffic (for example, an information relating to an amount of the traffic) is one example of another information. In this case, the maintenance proposing part 113 may generate the map that is generated by overlaying the first layer at which the position of the road surface abnormality is plotted on the second at which the traffic is visualized, as illustrated in FIG. 11. In an example illustrated in FIG. 11, the road having the larger traffic is illustrated by a thicker line in the layer at which the traffic is visualized. An information relating to a distribution of inhabitants (residents) is another one example of another information. At least one of an information relating to the number of the inhabitants and an information relating to an attribute (for example, an age and the like) of the inhabitants is one example of the information relating to a distribution of inhabitants, for example. In this case, the maintenance proposing part 113 may generate the map that is generated by overlaying the first layer at which the position of the road surface abnormality is plotted on the second layer at which the distribution of the inhabitants is visualized.

The map generated by the maintenance proposing part 113 may be used for the maintenance proposal operation. Namely, the maintenance proposing part 113 may execute the maintenance proposal operation on the basis of the generated map (especially, the map having the multi-layered structure). For example, the maintenance proposing part 113 may execute the maintenance proposal operation on the basis of the map illustrated in FIG. 11 to preferentially propose the maintenance of the road surface on the road having the large traffic (for example, a major road such as the main line). For example, the maintenance proposing part 113 may execute the maintenance proposal operation on the basis of the map that is generated by overlaying the first layer at which the position of the road surface abnormality is plotted on the second layer at which the distribution of the inhabitants is visualized to preferentially propose the maintenance of the road surface at a point where the relatively many inhabitants inhabit and/or a point where relatively many vulnerable road persons (for example, at least one of kids and old persons) inhabit. As described above, the maintenance proposing part 113 is capable of proposing the maintenance that is suitable for a certain region on the basis of the generated map (especially, the map having the multi-layered structure). Note that the operation of proposing the maintenance on the basis of the map having the multi-layered structure is substantially equivalent to an operation of proposing the maintenance on the basis of the road surface condition data that is the estimated result of the road surface condition estimating part 112 and the data (for example, the information included in the above described second layer) that is different from the road surface condition data.

When the map generated by the maintenance proposing part 113 is used for the maintenance proposal operation, another information visualized in the map may include an information that is usable to prioritize the maintenance of the road surface. Note that each of the information relating to the traffic and the information relating to the distribution of the inhabitants is one example of the information that is usable to prioritize the maintenance of the road surface. This is because the maintenance proposing part 113 is capable of preferentially proposing the maintenance of the road surface on the road having the large traffic on the basis of the information relating to the traffic and preferentially proposing the maintenance of the road surface at the point where the relatively many inhabitants inhabit and/or the point where relatively many vulnerable road persons inhabit, as described above. At least one of an information relating to a traffic of the vehicles, an information relating to a traffic of a pedestrians, an information relating to a traffic of a large-size vehicles (for example, a ratio of the large-size vehicles to all vehicles) and an information relating to an average speed of the vehicles is one example of the information relating to the traffic. Moreover, an information relating to a width of the road, an information relating to the presence of a sidewalk (in other words, a footpath), an information relating to a presence of a side strip (in other words, a roadside), an information relating to a presence of a fork road, an information relating to a presence of an intersection, an information relating to a presence of a signal, an information relating to a distribution of a building (for example, an information relating to a distribution of at least one of a school, a house, a shopping plaza (in other words, a commercial facility) and a plant), an information relating to a sunshine condition and an information relating to a location condition of the road (in other words, an information relating to a construction condition of the road, and for example, an information indicating whether or not the road is a central street (in other words, a high street or a main street)) is another one example of the information that is usable to prioritize the maintenance of the road surface. Even in this case, the maintenance proposing part 113 is capable of proposing the maintenance in an appropriate manner on the basis of the road surface condition data and another information that is usable to prioritize the maintenance of the road surface.

For example, the maintenance proposing part 113 may compare the road surface condition datum of different regions and objectively evaluate a road surface condition level that represents whether or not the condition of the road surface in the region is good. In this case, when the road surface condition level is relatively high (namely, there is not so many road surface abnormality) in a certain region, the fact that the road surface condition level is relatively high may be used as a strength of that region. On the other hand, when the road surface condition level is relatively low (namely, there is relatively many road surface abnormality) in a certain region, the fact that the road surface condition level is relatively low may be used to request the budget to the road in that region. Alternatively, for example, the maintenance proposing part 113 may set a target level of the road surface condition level in one region on the basis of the road surface condition data of another region. For example, the maintenance proposing part 113 may set the target level of the road surface condition level in one region to a level based on the road surface condition level in another region (for example, a level that is same as the road surface condition level in another region) on the basis of the road surface condition data of another region.

(3) MODIFIED EXAMPLE

Next, another modified example of the road surface condition estimation system SYS (namely, at least one of the road surface condition estimation systems SYS1 and SYS2, same applies to the following description).

(3-1) Modified Example #1

Each vehicle 2 may be provided a camera that is configured to image a circumstance of the vehicle 2. In this case, an image data that represents the circumstance of the vehicle 2 and that is the imaged result of the camera may be transmitted from the vehicle 2 to the server 1. The image data received by the server 1 may be stored by the storage apparatus 12.

The road surface condition estimating part 112 of the server that receives the image data may estimate a type of the road surface abnormality by image-analyzing the image data when the road surface condition estimating part 112 estimates that there exists the road surface abnormality. For example, the road surface condition estimating part 112 may estimate which the road surface abnormality is the depression of the road surface, the hole at the road surface, the bump of the road surface, the rut formed at the road surface, the crack at the road surface or the deterioration of the road surface. For example, the road surface condition estimating part 112 may estimate which the road surface abnormality is the falling object from the vehicle 2, the mass of the peeled asphalt or the like, the falling rock, the vehicle involved in the accident and the dead animal. Alternatively, when the road surface condition estimating part 112 estimates that there exists the road surface abnormality, the user of the road surface condition estimation system SYS or the like may watch the image data and specify the type of the road surface abnormality.

(3-2) Modified Example #2

The road surface estimating part 112 may estimate the condition of the road surface by using a unique information that is unique to each point on a driving route along which the vehicle travels, in addition to the above described behavior data and so on. Alternatively, the road surface condition estimating part 112 may correct the estimated result of the condition of the road surface based on the behavior data by using the unique information that is unique to each point on the driving route along which the vehicle travels. Here, it is preferable that the unique information that is unique to each point be an information that affects the estimated result of the condition of the road surface. More specifically, it is preferable that the unique information that is unique to each point be an information relating to a first matter (in other words, an event or a situation) that prevents the estimation of the condition of the road surface at each point (namely, that deteriorates the accuracy of the estimation) and/or a second matter that causes the first matter that prevents the estimation of the condition of the road surface at each point. As a result, the accuracy of the estimation of the condition of the road surface improves.

At least one of an information relating to a temperature at each point and an information relating to a weather at each point is one example of the unique information that is unique to each point. For example, when the temperature at the point where at least one of the abnormality conditions #1 and #2 is satisfied (for example, the behavior of the vehicle 2 is the first or second specific behavior) is so low that the road surface freezes, the road surface condition estimating part 112 may estimate that the reason why at least one of the abnormality conditions #1 and #2 is satisfied is the skid of the vehicle 2 due to the freeze of the road surface. For example, when the weather at the point where at least one of the abnormality conditions #1 and #2 is satisfied is a weather (for example, a rain or a snow) that possibly lead to the skid of the vehicle 2, the road surface condition estimating part 112 may estimate that the reason why at least one of the abnormality conditions #1 and #2 is satisfied is the skid of the vehicle 2 due to the rain or the snow wetting the road surface. In this case, the road surface condition estimating part 112 may estimate that there is not the road surface abnormality at the point where at least one of the abnormality conditions #1 and #2 is satisfied, even if at least one of the abnormality conditions #1 and #2 is satisfied. Alternatively, the road surface condition estimating part 112 may change a standard (in other words, a criteria or a rule) for estimating the condition of the road surface on the basis of the temperature or the weather at the point where the vehicle 2 travels. The standard for estimating the condition of the road surface may include at least one of the abnormality conditions #1 and #2.

An information relating to a curvature of the road at each point is one example of the unique information that is unique to each point. For example, when the curvature at the point where at least one of the abnormality conditions #1 and #2 is satisfied is relatively large (alternatively, when it is estimated on the basis of the curvature that there is a curve road at the point where at least one of the abnormality conditions #1 and #2 is satisfied), the road surface condition estimating part 112 may estimate that the reason why at least one of the abnormality conditions #1 and #2 is satisfied is a turn of the vehicle 2 on the curve road. In this case, the road surface condition estimating part 112 may estimate that there is not the road surface abnormality at the point where at least one of the abnormality conditions #1 and #2 is satisfied, even if at least one of the abnormality conditions #1 and #2 is satisfied. Alternatively, the road surface condition estimating part 112 may change the standard for estimating the condition of the road surface on the basis of a result of a determination whether the vehicle 2 travels on a straight road or the curve road.

An information relating to a gradient (in other words, an inclination or a slope) of the road at each point is one example of the unique information that is unique to each point. For example, when the gradient at the point where at least one of the abnormality conditions #1 and #2 is satisfied is relatively large (alternatively, when it is estimated on the basis of the gradient that there is a sloping road at the point where at least one of the abnormality conditions #1 and #2 is satisfied), the road surface condition estimating part 112 may estimate that the reason why at least one of the abnormality conditions #1 and #2 is satisfied is a variation of the longitudinal acceleration rate and/or the vertical acceleration rate of the vehicle 2 due to the sloping road. In this case, the road surface condition estimating part 112 may estimate that there is not the road surface abnormality at the point where at least one of the abnormality conditions #1 and #2 is satisfied, even if at least one of the abnormality conditions #1 and #2 is satisfied. Alternatively, the road surface condition estimating part 112 may change the standard for estimating the condition of the road surface on the basis of a result of a determination whether the vehicle 2 travels on a flat road or the sloping road (alternatively, on the basis of the gradient of the road surface).

At least one of an information relating to a surface temperature at each point, an information relating to an amount of rainfall at each point, an information relating to an amount of snowfall at each point, an information relating to an amount of snow cover (in other words, a snow depth) at each point, an information relating to an annual amount of rainfall at each point, an information relating to an annual minimum temperature at each point, an information relating to an annual maximum temperature at each point, an information relating to an annual average temperature at each point, an information relating to a degree of latitude of each point, an information relating to a degree of longitude of each point, an information relating to an altitude of each point, an information relating to the width of the road at each point, an information relating to the presence of the side strip at each point, an information relating to the presence of the fork road at each point, an information relating to the presence of the intersection at each point, an information relating to the presence of the signal at each point, an information relating to the traffic (for example, the traffic of at least one of the vehicle and the pedestrian) at each point, an information relating to the presence of a parked vehicle at each point, an information relating to the number of the parked vehicle at each point, an information relating to a ratio of the large-size vehicle traveling on the road at each point, an information relating to an average speed of vehicles traveling on the road at each point and so on is one example of the unique information that is unique to each point. Depending on these information, there is a possibility that it is estimated on the basis of the behavior data that at least one of the abnormality conditions #1 and #2 is satisfied apparently although there is not the road surface, because these information also affect the traveling of the vehicle 2. Thus, in this case, the accuracy of the estimation of the condition of the road surface improves by estimating the condition of the road surface on the basis of the behavior information and the unique information that is unique to each point.

Note that an influence to the accuracy of the estimation of the condition of the road surface from the unique information that is unique to each point may be measured actually, experimentally or by a simulation. In this case, a rule that establishes how to estimate the condition of the road surface on the basis of the unique information that is unique to each point may be set on the basis of an information relating to the influence measured in advance. As a result, the road surface condition estimating part 112 is capable of appropriately estimating the condition of the road surface on the basis of the behavior data and the unique information that is unique to each point, regardless of the content of the unique information that is unique to each point.

(3-3) Modified Example #3

The road surface condition estimating part 112 may estimate the condition of the road surface by using a unique information that is unique to the vehicle 2 itself, in addition to the above described behavior data and so on. Alternatively, the road surface condition estimating part 112 may correct the estimated result of the condition of the road surface based on the behavior data by using the unique information that is unique to the vehicle 2 itself. This is because there is a possibility that the behavior of one vehicle 2 may be different from the behavior of another vehicle 2 even when both vehicles 2 travels on the same road in a same manner. At least one of an information relating to a body type of the vehicle 2 (for example, an information indicating whether the body type is a SUV (Sport Utility Vehicle) type, a compact car type, a sedan type, a wagon type, a bus type or a truck type), an information relating to a size of the vehicle 2 and an information relating to a weight of the vehicle 2 is one example of the unique information that is unique to the vehicle 2 itself. As a result, the accuracy of the estimation of the condition of the road surface improves.

The road surface estimating part 112 may estimate the condition of the road surface by using a unique information that is unique to a driver of the vehicle 2, in addition to the above described behavior data and so on. Alternatively, the road surface condition estimating part 112 may correct the estimated result of the condition of the road surface based on the behavior data by using the unique information that is unique to the driver of the vehicle 2. This is because there is a possibility that the behavior of the vehicle 2 driven by one driver may be different from the behavior of another vehicle 2 driven by another driver even when both drivers drive same vehicle 2 on the same road. At least one of an information relating to an age of the driver, an information relating to a sex of the driver and an information relating to a level of a driving skill of the driver is one example of the unique information that is unique to the driver. As a result, the accuracy of the estimation of the condition of the road surface improves.

(4) ADDITIONAL STATEMENT

Relating to the above described embodiment, following additional statements will be disclosed.

(4-1) Additional Statement 1

A road surface condition estimation apparatus according to the additional statement 1 is a road surface condition estimation apparatus having: a collecting device that is configured to collect, from each of a plurality of vehicles, behavior information relating to a behavior of each vehicle; a determining device that is configured to determine on the basis of the behavior information whether or not an abnormality condition is satisfied, the abnormality condition being set on the basis of a specific behavior, the specific behavior being a behavior expected to be taken by the vehicle when the vehicle encounters a road surface abnormality, the road surface abnormality including at least one of a defect of a road surface and an obstacle on the road surface; and an estimating device that is configured to estimate a condition of the road surface on the basis of a determined result of the determining device.

Alternatively, a road surface condition estimation apparatus according to the additional statement 1 may be a road surface condition estimation apparatus having a controller, the controller being programmed to: collect, from each of a plurality of vehicles, behavior information relating to a behavior of each vehicle; determine on the basis of the behavior information whether or not an abnormality condition is satisfied, the abnormality condition being set on the basis of a specific behavior, the specific behavior being a behavior expected to be taken by the vehicle when the vehicle encounters a road surface abnormality, the road surface abnormality including at least one of a defect of a road surface and an obstacle on the road surface; and estimate a condition of the road surface on the basis of a determined result.

The road surface condition estimation apparatus according to the additional statement 1 is capable of appropriately estimating the condition (in other words, state) of the road surface (for example, whether or not there exists the road surface abnormality) by determining whether or not the abnormality condition (in other words, an abnormality requirement) set on the basis of the specific behavior is satisfied. Moreover, since the road surface condition estimation apparatus according to the additional statement 1 collect the behavior information from the plurality of vehicles, the estimated result of the condition of the road surface is more accurate, compared to the case where the behavior information is collected from only one vehicle.

(4-2) Additional Statement 2

A road surface condition estimation apparatus according to the additional statement 2 is the road surface condition estimation apparatus according to the additional statement 1, wherein the specific behavior includes a first specific behavior that the vehicle avoids the road surface abnormality, the abnormality condition includes a first abnormality condition that the behavior of the vehicle is the first specific behavior, the estimating device is configured to (alternatively, the controller is programmed to) estimate that there exists the road surface abnormality at one point on a road, when it is determined that the first abnormality condition is satisfied at the one point.

There is a relatively high possibility that a position at which the behavior of the vehicle is the first specific behavior to avoid the road surface abnormality is a position at which there actually exists the road surface abnormality. This is because there is expected to be a relatively high possibility that the behavior of the vehicle at the position at which there exists the road surface abnormality is different from the behavior of the vehicle at the position at which there is not the road surface abnormality in order to avoid the road surface abnormality. Thus, the road surface condition estimation apparatus according to the additional statement 2 is capable of appropriately estimating the condition of the road surface on the basis of the determined result whether or not the first abnormality condition that the behavior of the vehicle is the first specific behavior is satisfied.

(4-3) Additional Statement 3

A road surface condition estimation apparatus according to the additional statement 3 is the road surface condition estimation apparatus according to the additional statement 1 or 2, wherein the specific behavior includes a second specific behavior that the vehicle travels on a position of the road surface abnormality with the vehicle being affected by the road surface abnormality, the abnormality condition includes a second abnormality condition that the behavior of the vehicle is the second specific behavior, the estimating device is configured to (alternatively, the controller is programmed to) estimate that there exists the road surface abnormality at one point on a road, when it is determined that the second abnormality condition is satisfied at the one point.

There is a relatively high possibility that a position at which the behavior of the vehicle is the second specific behavior that the vehicle travels with being affected by the road surface abnormality is a position at which there actually exists the road surface abnormality. This is because there is expected to be a relatively high possibility that the behavior of the vehicle at the position at which there exists the road surface abnormality is different from the behavior of the vehicle at the position at which there is not the road surface abnormality, because the vehicle is affected by the road surface abnormality. Thus, the road surface condition estimation apparatus according to the additional statement 3 is capable of appropriately estimating the condition of the road surface on the basis of the determined result whether or not the second abnormality condition that the behavior of the vehicle is the second specific behavior is satisfied.

(4-4) Additional Statement 4

A road surface condition estimation apparatus according to the additional statement 4 is the road surface condition estimation apparatus according to the additional statement 3, wherein the second specific behavior includes a first behavior that a lateral acceleration rate of the vehicle is within a predetermined range, the abnormality condition includes a first condition that the behavior of the vehicle is the first behavior, the estimating device is configured to (alternatively, the controller is programmed to) estimate that there exists a rut as the road surface abnormality at the one point on the road, when it is determined that the first condition is satisfied at the one point.

The road surface condition estimation apparatus according to the additional statement 4 is capable of appropriately estimating the condition of the road surface (especially, the presence of the rut) on the basis of the determined result whether or not the first condition that the behavior of the vehicle is the first behavior is satisfied.

(4-5) Additional Statement 5

A road surface condition estimation apparatus according to the additional statement 5 is the road surface condition estimation apparatus according to the additional statement 4, wherein the estimating device is configured to (alternatively, the controller is programmed to) estimate that there exists a continuous rut as the road surface abnormality between two points on the road, when it is determined that the first condition is satisfied at each of the two points and a distance between the two points is less than a predetermined distance on the road.

The road surface condition estimation apparatus according to the additional statement 5 is capable of appropriately estimating the condition of the road surface (especially, the presence of the rut).

(4-6) Additional Statement 6

A road surface condition estimation apparatus according to the additional statement 6 is the road surface condition estimation apparatus according to any one of the additional statements 3 to 5, wherein the second specific behavior includes a second behavior that a difference between an amount of a variation per unit time of a wheel speed of a non-driven wheel of the vehicle and an acceleration rate of the vehicle is equal to or more than a predetermined threshold value, the second abnormality condition includes a second condition that the behavior of the vehicle is the second behavior, the estimating device is configured to (alternatively, the controller is programmed to) estimate that there exists the road surface abnormality at the one point on the road, when it is determined that the second condition is satisfied at the one point.

The road surface condition estimation apparatus according to the additional statement 6 is capable of appropriately estimating the condition of the road surface on the basis of the determined result whether or not the second condition that the behavior of the vehicle is the second behavior is satisfied.

(4-7) Additional Statement 7

A road surface condition estimation apparatus according to the additional statement 7 is the road surface condition estimation apparatus according to any one of the additional statements 1 to 6, wherein the specific behavior includes a second specific behavior that the vehicle travels on a position of the road surface abnormality with the vehicle being affected by the road surface abnormality, the behavior information includes an input information relating to an input from the road surface to the vehicle, the determining device is configured to (alternatively, the controller is programmed to) extract, from the input information, an up-and-down component caused by concavity and/or convexity at the road surface and calculate an index value representing a degree of the concavity and/or the convexity at the road surface on the basis of the up-and-down component, the abnormality condition includes a third abnormality condition that an average value of the index value at one point on a road is equal to or larger than a first predetermined value, the estimating device is configured to (alternatively, the controller is programmed to) estimate that there exists roughness of the road surface as the road surface abnormality at the one point, when it is determined that the third abnormality condition is satisfied.

The road surface condition estimation apparatus according to the additional statement 7 is capable of appropriately estimating the condition of the road surface (especially, the roughness of the road surface) on the basis of the determined result whether or not the third abnormality condition that the average value of the index value at the one point is equal to or larger than the first predetermined value is satisfied.

(4-8) Additional Statement 8

A road surface condition estimation apparatus according to the additional statement 8 is the road surface condition estimation apparatus according to the additional statement 7, wherein the abnormality condition includes a fourth abnormality condition that a maximum value of the index value at the one point on the road is equal to or larger than a second threshold value that is larger than the first predetermined value, the estimating device is configured to (alternatively, the controller is programmed to) estimate that there exists local concavity and/or convexity as the road surface abnormality at the one point, when it is determined that the fourth abnormality condition is satisfied.

The road surface condition estimation apparatus according to the additional statement 8 is capable of appropriately estimating the condition of the road surface (especially, the local concavity and/or convexity, and for example, a pothole) on the basis of the determined result whether or not the fourth abnormality condition that the maximum value of the index value at the one point is equal to or larger than the second predetermined value is satisfied.

(4-9) Additional Statement 9

A road surface condition estimation apparatus according to the additional statement 9 is the road surface condition estimation apparatus according to any one of the additional statements 1 to 8, wherein the specific behavior includes a second specific behavior that the vehicle travels on a position of the road surface abnormality with the vehicle being affected by the road surface abnormality, the behavior information includes an input information relating to an input from the road surface to the vehicle, the determining device is configured to (alternatively, the controller is programmed to) extract, from the input information, an up-and-down component caused by concavity and/or convexity at the road surface and calculate an index value representing a degree of the concavity and/or the convexity at the road surface on the basis of the up-and-down component, the abnormality condition includes a fourth abnormality condition that a maximum value of the index value at one point on a road is equal to or larger than a second predetermined value, the estimating device is configured to (alternatively, the controller is programmed to) estimate that there exists local concavity and/or convexity as the road surface abnormality at the one point, when it is determined that the fourth abnormality condition is satisfied.

The road surface condition estimation apparatus according to the additional statement 9 is capable of appropriately estimating the condition of the road surface (especially, the local concavity and/or convexity, and for example, a pothole) on the basis of the determined result whether or not the fourth abnormality condition that the maximum value of the index value at the one point is equal to or larger than the second predetermined value is satisfied.

(4-10) Additional Statement 10

A road surface condition estimation apparatus according to the additional statement 10 is the road surface condition estimation apparatus according to any one of the additional statements 1 to 9, wherein the estimating device is configured to (alternatively, the controller is programmed to) estimate the condition of the road surface on the basis of the determined result and a unique information that is unique to one point on a road.

The road surface condition estimation apparatus according to the additional statement 10 is capable of improving the accuracy of the estimated result of the condition of the road surface.

(4-11) Additional Statement 11

A road surface condition estimation apparatus according to the additional statement 11 is the road surface condition estimation apparatus according to any one of additional statement 10, wherein the unique information includes an information relating to a first matter that prevents the estimation of the condition of the road surface at the one point and/or a second matter that causes the first matter that prevents the estimation of the condition of the road surface at the one point.

The road surface condition estimation apparatus according to the additional statement 11 is capable of improving the accuracy of the estimated result of the condition of the road surface.

(4-12) Additional Statement 12

A road surface condition estimation apparatus according to the additional statement 12 is the road surface condition estimation apparatus according to any one of the additional statements 1 to 11, wherein the estimating device is configured to (alternatively, the controller is programmed to) estimate the condition of the road surface on the basis of the determined result and the behavior information collected from at least two vehicles that travel at one point on a road at different times, respectively.

The road surface condition estimation apparatus according to the additional statement 12 is capable of improving the accuracy of the estimated result of the condition of the road surface.

(4-13) Additional Statement 13

A road surface condition estimation apparatus according to the additional statement 13 is the road surface condition estimation apparatus according to the additional statement 12, wherein the estimating device is configured to (alternatively, the controller is programmed to) estimate that there is not the road surface abnormality at the one point, when it is determined that the abnormality condition is satisfied at the one point and a difference between the behavior of the vehicle traveling at the one point at a first time and the behavior of the vehicle traveling at the one point at a second time is less than a predetermined amount, wherein the second time is a time at which a predetermined time elapses from the first time, the estimating device is configured to (alternatively, the controller is programmed to) estimate that there exists the road surface abnormality at the one point, when it is determined that the abnormality condition is satisfied at the one point and the difference between the behavior of the vehicle traveling at the one point at the first time and the behavior of the vehicle traveling at the one point at the second time is larger than the predetermined amount.

The road surface condition estimation apparatus according to the additional statement 13 is capable of improving the accuracy of the estimated result of the condition of the road surface.

(4-14) Additional Statement 14

A road surface condition estimation apparatus according to the additional statement 14 is the road surface condition estimation apparatus according to any one of the additional statements 1 to 13, wherein the estimating device is configured to (alternatively, the controller is programmed to) estimate a degree of a deterioration of the road surface on the basis of the behavior information and/or to estimate a deterioration speed of the road surface at each position on a road on the basis of an estimated result of the condition of the road surface at each position on the road, the road surface condition estimation apparatus further comprises a proposing device that is configured to propose a maintenance of the road surface on the basis of the estimated result (alternatively, the controller is further programmed to propose a maintenance of the road surface on the basis of the estimated result).

The road surface condition estimation apparatus according to the additional statement 14 is capable of appropriately proposing the maintenance of the road surface on the basis of the estimated result of the road surface.

(4-15) Additional Statement 15

A road surface condition estimation apparatus according to the additional statement 15 is the road surface condition estimation apparatus according to the additional statement 14, wherein The proposing device is configured to (alternatively, the controller is programmed to) propose the maintenance of the road surface, when the degree of the deterioration of the road surface at one point on the road is equal to or larger than a predetermined threshold value on the basis of the estimated result, the predetermined threshold value is variable on the basis of the deterioration speed of the road surface at the one point.

The road surface condition estimation apparatus according to the additional statement 15 is capable of appropriately proposing the maintenance of the road surface on the basis of the estimated result of the road surface (especially, the degree of the deterioration of the road surface and the deterioration speed).

(4-16) Additional Statement 16

A road surface condition estimation apparatus according to the additional statement 16 is the road surface condition estimation apparatus according to the additional statement 15, wherein the predetermined threshold value is set so that the predetermined threshold value becomes smaller as the deterioration speed of the road surface at the one point is faster.

The road surface condition estimation apparatus according to the additional statement 16 is capable of appropriately proposing the maintenance of the road surface sooner as the deterioration speed of the road surface is faster.

(4-17) Additional Statement 17

A road surface condition estimation apparatus according to the additional statement 17 is the road surface condition estimation apparatus according to any one of the additional statements 1 to 16, wherein the road surface condition estimation apparatus further comprises a proposing device that is configured to propose a maintenance of the road surface on the basis of an estimated result and another information different from an information relating to the condition of the road surface (alternatively, the controller is further programmed to propose a maintenance of the road surface on the basis of an estimated result and another information different from an information relating to the condition of the road surface).

The road surface condition estimation apparatus according to the additional statement 17 is capable of appropriately proposing the maintenance of the road surface by associating the estimated result of the road surface with the another information.

(4-18) Additional Statement 18

A road surface condition estimation apparatus according to the additional statement 18 is the road surface condition estimation apparatus according to the additional statement 17, wherein the another information includes an information that is usable to prioritize the maintenance of the road surface.

The road surface condition estimation apparatus according to the additional statement 18 is capable of appropriately proposing the maintenance of the road surface by associating the estimated result of the road surface with the another information.

(4-19) Additional Statement 19

A road surface condition estimation apparatus according to the additional statement 19 is a road surface condition estimation apparatus having: a collecting device that is configured to collect, from a vehicle, behavior information relating to a behavior of the vehicle; a determining device that is configured to determine on the basis of the behavior information whether or not the behavior of the vehicle is a specific behavior that the vehicle avoids a road surface abnormality, the road surface abnormality including at least one of a defect of a road surface and an obstacle on the road surface; and an estimating device that is configured to estimate a position of the road surface abnormality on the basis of a determined result of the determining device.

Alternatively, a road surface condition estimation apparatus according to the additional statement 19 may be a road surface condition estimation apparatus having a controller, the controller being programmed to: collect, from a vehicle, behavior information relating to a behavior of the vehicle; determine on the basis of the behavior information whether or not the behavior of the vehicle is a specific behavior that the vehicle avoids a road surface abnormality, the road surface abnormality including at least one of a defect of a road surface and an obstacle on the road surface; and estimate a position of the road surface abnormality on the basis of a determined result.

There is a relatively high possibility that a position at which the behavior of the vehicle is the specific behavior to avoid the road surface abnormality is a position at which there actually exists the road surface abnormality. This is because there is expected a relatively high possibility that the behavior of the vehicle at the position at which there exists the road surface abnormality is different from the behavior of the vehicle at the position at which there is not the road surface abnormality in order to avoid the road surface abnormality. Thus, the road surface condition estimation apparatus according to the additional statement 19 is capable of appropriately estimating the position of the road surface abnormality on the basis of the determined result whether or not the behavior of the vehicle is the specific behavior.

(4-20) Additional Statement 20

A road surface condition estimation method according to the additional statement 20 is a road surface condition estimation method including: a collecting step at which an input information relating to an input from a road surface to a vehicle is collected from the vehicle with a position of the vehicle being associated with the input information; an extracting step at which an up-and-down component caused by concavity and/or convexity at the road surface is extracted from the input information; calculating step at which an index value representing a degree of the concavity and/or the convexity at the road surface is calculated on the basis of the up-and-down component and an average value of the index value at one point on a road is calculated; and determining step at which it is determined that the road surface is rough at the one point when the calculated average value is equal to or larger than a first predetermined value and it is determined that there exists local concavity and/or convexity at the one point when a maximum value at the one point is equal to or larger than a second predetermined value that is larger than the first predetermined value.

Alternatively, a road surface condition estimation method according to the additional statement 20 may be a road surface condition estimation method including: collecting an input information relating to an input from a road surface to a vehicle from the vehicle with a position of the vehicle being associated with the input information; extracting an up-and-down component caused by concavity and/or convexity at the road surface from the input information; calculating an index value representing a degree of the concavity and/or the convexity at the road surface on the basis of the up-and-down component and calculating an average value of the index value at one point on a road; and determining that the road surface is rough at the one point when the calculated average value is equal to or larger than a first predetermined value and determining that there exists local concavity and/or convexity at the one point when a maximum value of the index value at the one point is equal to or larger than a second predetermined value that is larger than the first predetermined value.

The road surface condition estimation method according to the additional statement 20 is capable of appropriately determining the roughness of the road surface and local concavity and/or convexity on the basis of the index value that represents the degree of the concavity and/or the convexity at the road surface calculated from the input information collected from each of the plurality of vehicles. Thus, the estimated result of the condition of the road surface is more accurate, compared to the case where the condition of the road surface is estimated on the basis of the behavior information collected from only one vehicle, for example.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2018-84209, filed on Apr. 25, 2018, the entire contents of which are incorporated herein by reference. This application is also based upon and claims the benefit of priority of the prior Japanese Patent Application No. 2018-130872, filed on Jul. 10, 2018, the entire contents of which are incorporated herein by reference. This application is also based upon and claims the benefit of priority of the prior Japanese Patent Application No. 2019-004123, filed on Jan. 15, 2019, the entire contents of which are incorporated herein by reference. In addition, the entire contents of the above described Patent Literatures 1 to 3 and the above described Non Patent Literature 1 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A road surface condition estimation apparatus and a road surface condition estimation method, each of which involve such changes, are also intended to be within the technical scope of the present invention.

REFERENCE SIGNS LIST 1 server
11 information processing apparatus
111 data collecting part
112 road surface condition estimating part
113 maintenance proposing part 12 storage apparatus
1' analysis apparatus
11' collecting part
12' extracting part
13' calculating part
14' determining part
2 vehicle
21 GPS apparatus
22 detect apparatus
23 ECU
231 data collecting part
232 data transmittance controlling part
SYS1, SYS2 road surface condition estimation system

The invention claimed is:

1. A road surface condition estimation apparatus comprising:
a controller programmed to:
collect, from each of a plurality of vehicles, behavior information relating to a behavior of each vehicle;
determine on the basis of the behavior information whether or not an abnormality condition is satisfied, the abnormality condition being set on the basis of a specific behavior, the specific behavior being a behavior expected to be taken by the vehicle when the vehicle encounters a road surface abnormality, the road surface abnormality including at least one of a defect of a road surface and an obstacle on the road surface; and
estimate a condition of the road surface on the basis of a determined result, wherein
the specific behavior includes a second specific behavior that the vehicle travels on a position of the road surface abnormality with the vehicle being affected by the road surface abnormality,
the abnormality condition includes a second abnormality condition that the behavior of the vehicle is the second specific behavior,
the controller is programmed to estimate that there exists the road surface abnormality at one point on a road, when it is determined that the second abnormality condition is satisfied at the one point,
the second specific behavior includes a second behavior that a difference between an amount of a variation per unit time of a wheel speed of a non-driven wheel of the vehicle and an acceleration rate of the vehicle is equal to or more than a predetermined threshold value,
the second abnormality condition includes a second condition that the behavior of the vehicle is the second behavior, and
the controller is programmed to estimate that there exists the road surface abnormality at the one point on the road, when it is determined that the second condition is satisfied at the one point.

2. The road surface condition estimation apparatus according to claim 1, wherein
the specific behavior includes a first specific behavior that the vehicle avoids the road surface abnormality,
the abnormality condition includes a first abnormality condition that the behavior of the vehicle is the first specific behavior, and
the controller is programmed to estimate that there exists the road surface abnormality at one point on a road, when it is determined that the first abnormality condition is satisfied at the one point.

3. The road surface condition estimation apparatus according to claim 1, wherein
the second specific behavior includes a first behavior that a lateral acceleration rate of the vehicle is within a predetermined range,
the abnormality condition includes a first condition that the behavior of the vehicle is the first behavior, and
the controller is programmed to estimate that there exists a rut as the road surface abnormality at the one point on the road, when it is determined that the first condition is satisfied at the one point.

4. The road surface condition estimation apparatus according to claim 3, wherein the controller is programmed to estimate that there exists a continuous rut as the road surface abnormality between two points on the road, when it is determined that the first condition is satisfied at each of the two points and a distance between the two points is less than a predetermined distance on the road.

5. The road surface condition estimation apparatus according to claim 1, wherein the behavior information includes an input information relating to an input from the road surface to the vehicle, the controller is programmed to extract, from the input information, a waveform component caused by concavity and/or convexity at the road surface and calculate an index value representing a degree of the concavity and/or the convexity at the road surface on the basis of the waveform component, the abnormality condition includes a third abnormality condition that an average value of the index value at one point on the road is equal to or larger than a first predetermined value, the controller is programmed to estimate that there exists roughness of the road surface as the road surface abnormality at the one point, when it is determined that the third abnormality condition is satisfied.

6. The road surface condition estimation apparatus according to claim 5, wherein
the abnormality condition includes a fourth abnormality condition that a maximum value of the index value at the one point on the road is equal to or larger than a second threshold value that is larger than the first predetermined value, and
the controller is programmed to estimate that there exists local concavity and/or convexity as the road surface abnormality at the one point, when it is determined that the fourth abnormality condition is satisfied.

7. The road surface condition estimation apparatus according to claim 1, wherein
the behavior information includes an input information relating to an input from the road surface to the vehicle,
the controller is programmed to extract, from the input information, a waveform component caused by concavity and/or convexity at the road surface and calculate an index value representing a degree of the concavity and/or the convexity at the road surface on the basis of the waveform component,
the abnormality condition includes a fourth abnormality condition that a maximum value of the index value at one point on a road is equal to or larger than a second predetermined value, and
the controller is programmed to estimate that there exists local concavity and/or convexity as the road surface abnormality at the one point, when it is determined that the fourth abnormality condition is satisfied.

8. The road surface condition estimation apparatus according to claim 1, wherein the controller is programmed to estimate the condition of the road surface on the basis of the determined result and a unique information that is unique to one point on a road.

9. The road surface condition estimation apparatus according to claim 8, wherein the unique information includes an information relating to a first matter that prevents the estimation of the condition of the road surface at the one point and/or a second matter that causes the first matter that prevents the estimation of the condition of the road surface at the one point.

10. The road surface condition estimation apparatus according to claim 1, wherein the controller is programmed to estimate the condition of the road surface on the basis of the determined result and the behavior information collected from at least two vehicles that travel at one point on a road at different times, respectively.

11. The road surface condition estimation apparatus according to claim 10, wherein
the controller is programmed to estimate that there is not the road surface abnormality at the one point, when it is determined that the abnormality condition is satisfied at the one point and a difference between the behavior of the vehicle traveling at the one point at a first time and the behavior of the vehicle traveling at the one point at a second time is less than a predetermined amount, wherein the second time is a time at which a predetermined time elapses from the first time, and
the controller is programmed to estimate that there exists the road surface abnormality at the one point, when it is determined that the abnormality condition is satisfied at the one point and the difference between the behavior of the vehicle traveling at the one point at the first time and the behavior of the vehicle traveling at the one point at the second time is larger than the predetermined amount.

12. The road surface condition estimation apparatus according to claim 1, wherein the controller is programmed to estimate a degree of a deterioration of the road surface on the basis of the behavior information and/or to estimate a deterioration speed of the road surface at each position on the road on the basis of an estimated result of the condition of the road surface at each position on the road, the controller is further programmed to propose a maintenance of the road surface on the basis of the estimated result.

13. The road surface condition estimation apparatus according to claim 12, wherein
the controller is programmed to propose the maintenance of the road surface, when the degree of the deterioration of the road surface at one point on the road is equal to or larger than a predetermined threshold value on the basis of the estimated result, and
the predetermined threshold value is variable on the basis of the deterioration speed of the road surface at the one point.

14. The road surface condition estimation apparatus according to claim 13, wherein the predetermined threshold value is set so that the predetermined threshold value becomes smaller as the deterioration speed of the road surface at the one point is faster.

15. The road surface condition estimation apparatus according to claim 1, wherein the controller is further programmed to propose a maintenance of the road surface on the basis of an estimated result and another information different from an information relating to the condition of the road surface.

16. The road surface condition estimation apparatus according to claim 15, wherein the another information includes an information that is usable to prioritize the maintenance of the road surface.

17. A road surface condition estimation method including:
collecting a plurality of input information relating to an input from a road surface to each of a plurality of vehicles from each of the plurality of vehicles together with a position of each of the plurality of vehicles being associated with the plurality of input information;
extracting a plurality of waveform components caused by concavity and/or convexity at the road surface from the plurality of input information;
calculating a plurality of index values representing a degree of the concavity and/or the convexity at the road surface on the basis of the plurality of waveform components and calculating an average value of the plurality of index values at one point on a road; and
determining that the road surface is rough at the one point when the calculated average value is equal to or larger than a first predetermined value and determining that there exists local concavity and/or convexity at the one point when a maximum value of the plurality of index values at the one point is equal to or larger than a second predetermined value that is larger than the first predetermined value.

* * * * *